United States Patent [19]
Yokoyama et al.

[11] Patent Number: 6,088,420
[45] Date of Patent: Jul. 11, 2000

[54] REACTOR CORE

[75] Inventors: Tsugio Yokoyama; Ritsuo Yoshioka; Yasushi Tsuboi, all of Yokohama, Japan

[73] Assignee: Kabushiki Kaisha Toshiba, Kawasaki, Japan

[21] Appl. No.: 09/070,909

[22] Filed: May 4, 1998

[30] Foreign Application Priority Data

| May 9, 1997 | [JP] | Japan | 9-119597 |
| Feb. 26, 1998 | [JP] | Japan | 10-045740 |

[51] Int. Cl.⁷ ............................. G21C 3/32; G21C 3/34
[52] U.S. Cl. .................. 376/434; 376/435; 376/442; 376/443; 376/444; 376/448
[58] Field of Search ......................... 376/434, 443, 376/442, 448, 457, 444, 435

[56] References Cited

U.S. PATENT DOCUMENTS

| 3,702,803 | 11/1972 | Huebotter | 376/444 |
| 3,859,165 | 1/1975 | Radkowsky et al. | 176/18 |
| 4,097,331 | 6/1978 | Betten | 376/444 |
| 4,119,489 | 10/1978 | Itoh et al. | 376/444 |
| 4,142,934 | 3/1979 | Wild | 176/78 |
| 4,306,938 | 12/1981 | Yamanaka | 376/448 |
| 4,526,746 | 7/1985 | Fredin | 376/444 |
| 4,573,629 | 3/1986 | Imahashi et al. | 228/173.2 |
| 4,795,608 | 1/1989 | Nylund | 376/444 |
| 4,968,479 | 11/1990 | Ogiya et al. | 376/428 |
| 4,970,047 | 11/1990 | Ueda et al. | 376/443 |
| 5,089,221 | 2/1992 | Johansson et al. | 376/442 |
| 5,192,496 | 3/1993 | Soneda et al. | 376/428 |
| 5,202,085 | 4/1993 | Aoyama et al. | 376/435 |
| 5,416,812 | 5/1995 | Matzner | 376/371 |
| 5,627,865 | 5/1997 | Williamson et al. | 376/434 |
| 5,812,621 | 9/1998 | Takeda et al. | 376/171 |

FOREIGN PATENT DOCUMENTS

| 0 447 108 | 9/1991 | European Pat. Off. . | |
| 2 709 858 | 3/1995 | France . | |
| 51-035891 | 3/1976 | Japan | 376/448 |
| 59-081589 | 5/1984 | Japan | 376/448 |
| 7-119818 | 12/1995 | Japan . | |
| 08-021890 | 1/1996 | Japan | 376/171 |
| 8-021890 | 1/1996 | Japan . | |

OTHER PUBLICATIONS

R. Takeda, et al. "General Features of Resource–Renewable BWR (RBWR) and Scenario of Long–term Energy Supply", Int. Conf. Of GLOBAL 95', Versailles France, (1995), pp. 938–945.
Patent Abstracts of Japan, vol. 013, No. 550 (P–972), Dec. 8, 1989, JP 01 227993, Sep. 12, 1989.
Patent Abstracts of Japan, vol. 017, No. 228 (P–1531), May 11, 1993, JP 04 357493, Dec. 10, 1992.
Patent Abstracts of Japan, vol. 014, No. 185 (P–1036), Apr. 13, 1990, JP 02 032293, Feb. 2, 1990.
Patent Abstracts of Japan, vol. 017, No. 566 (P–1629), Oct. 14, 1993, JP 05 164874, Jun. 29, 1993.
Derwent Abstracts, AN 88–010512, JP 62 273485, Nov. 27, 1987.
Patent Abstracts of Japan, vol. 018, No. 439 (P–1787), Aug. 16, 1994, JP 06 0138275, May 20, 1994.
Patent Abstracts of Japan, vol. 096, No. 012, Dec. 26, 1996, JP 08 201562, Aug. 9, 1996.
Patent Abstracts of Japan, vol. 013, No. 316 (P–900), Jul. 18, 1989, JP 01 088189, Apr. 3, 1989.
Patent Abstracts of Japan, vol. 097, No. 009, Sep. 30, 1997, JP 09 127282, May 16, 1997.
Patent Abstracts of Japan, vol. 018, No. 596 (P–1825), Nov. 14, 1994, JP 06 222176, Aug. 12, 1994.
Patent Abstracts of Japan, vol. 017, No. 182 (P–1518), Apr. 8, 1993, JP 04 335190, Nov. 24, 1992.

*Primary Examiner*—Charles T. Jordan
*Assistant Examiner*—Jack Keith
*Attorney, Agent, or Firm*—Oblon, Spivak, McClelland, Maier & Neustadt, P.C.

[57] ABSTRACT

In a reactor core, there is charged a number of fuel assemblies composed of a channel box and a fuel bundle disposed therein, in which fuel rods adjacent to each other are arranged so as to provide a triangular shape and a ratio of a coolant channel cross section to a fuel cross section is set to be 1 or less.

14 Claims, 18 Drawing Sheets

REACTOR CORE

BACKGROUND OF THE INVENTION

The present invention relates to a reactor core which is applied to a water cooling reactor, and in particular, to a reactor core which has improvements in core internal structural materials, fuel design and core arrangement structure.

In general, a light water reactor, which is a water cooling reactor, is classified into a boiling water reactor and a pressurized water reactor. A number of fuel assemblies are charged in a reactor core of a boiling water reactor in four groups. In each fuel assembly, a fuel coating cladding) tube is filled with a fissile material as a nuclear fuel, and a heat generated by a nuclear reaction of the fissile material is removed by a coolant. A water is used as a coolant for removing the heat in the light water reactor.

Hydrogen contained in water has a high neutron moderation ability, and therefore, the conventional water cooling reactor has a high ratio of water, and a high energy neutron (fast neutron) generated by the nuclear fission is greatly moderated. Thus, a low-energy thermal neutron (slow neutron) occupies most of neutrons. In the case where the fissile material absorbs the low-energy neutron, a fissile reaction of newly generating about three neutrons is not caused, but a ratio of a neutron capture of absorbing the neutrons in an atomic nucleus without causing the nuclear fission, becomes great. Therefore, the number of neutrons generated per neutron absorption is reduced in the nuclear fission reaction by a low-energy neutron.

On the other hand, in a high-energy neutron (fast neutron), since a ratio of neutron capture reaction is low and the fissile reaction is great, two or more average neutrons per neutron absorption can be generated inclusive of the neutron capture effect. One of two or more fast neutrons newly generated is used for maintaining chain reaction, and on the other hand, the reminder thereof is absorbed in a parent material (nuclear material) such as $^{238}$U (U-238), thus, a fissionable material being effectively produced.

In a case where a ratio of production and annihilation of the fissionable material is 1 or more, it has been found that fuel breeding is performed and a resource energy can be secured. This is the reason why various countries have made a research and development of a breeder reactor which newly produces fissionable materials by a speed more than the development of consuming a nuclear material.

However, in a conventional water cooling reactor, the ratio of water, which is coolant, to fuel ranges from about 2.0 to 2.5, and accordingly, a fast neutron generated by a fissile reaction is moderated, and then, becomes a low energy. Thus, the breeding is not performed, and a ratio of production and annihilation of the fissile material was 1 or less, for example, a value of about 0.5. Therefore, in a breeder reactor, an uranium resource, which can be theoretically converted into a thermal energy at 100%, has mot been effectively utilized, and the uranium resource effectively utilized has been merely about 1%.

In the case of making use of a high-energy spectral neutron, in the conventional large-scale fast breeder reactor, there is the possibility that a reactivity (void reactivity) becomes positive due to the boiling of a coolant. However, in a water cooling reactor, it is important to make negative the void reactivity in view of stability and safety of a reactor core.

SUMMARY OF THE INVENTION

An object of the present invention is to substantially eliminate defects or drawbacks encountered in the prior art described above and to provide a reactor core capable of increasing a breeding ratio and improving a utilization factor of an uranium fuel.

An another object of the present invention is to provide a reactor core which has a breeding ratio of at least about 1 to improve a utilization factor of an uranium resource and which can hold a void reactivity at a negative value so as to achieve an environmental protection and to further improve stability and reliability of a reactor core.

A further object of the present invention is to provide a reactor core which has a breeding ratio of at least about 1 so that a utilization factor of the uranium resource is 100 time as much as a conventional reactor core and which can hold a void reactivity at a negative value so as to improve stability and economy of the reactor core, even if the reactor core has the same diametrical direction size as that of a conventional reactor core.

These and other objects can be achieved according to the present invention by providing, in one aspect, a reactor core including a number of fuel assemblies charged therein, wherein each of the fuel assemblies comprises a fuel bundle in which adjacent fuel rods are arranged so as to provide a triangular shape and a ratio of a coolant channel cross section to a fuel cross section is set to be 1 or less.

In this aspect, the fuel assemblies have an arrangement pitch of about 300 mm or more. The fuel assembly is composed of a cylindrical channel box and the fuel bundle disposed in the channel box and having substantially square cross section, the channel box being provided with a protrusion (projection) for removing a coolant at an outer side thereof. The fuel assembly is composed of a cylindrical channel box and the fuel bundle disposed in the channel box, the channel box being provided with a support pad at an upper portion thereof in an operating state so as to mutually support adjacent fuel assemblies in a transverse direction. The fuel bundle may be constructed in a manner that a number of fuel rods are arranged and held by means of a grid-shape spacer so as to provide a triangular shape. The grid-shape spacer is provided with grid and a spring means attached to the grid for preventing vibration of the fuel. The vibration preventive spring and the grid are formed integrally with each other, and the grid is formed of a stainless steel or inconell. The fuel bundle may be formed by assembling in a bundle a number of fuel rods each having a fuel cladding tube filled with a fuel material by means of a fuel spacer and at least either one of the channel box and the fuel cladding tube is formed of a stainless steel. Pultonium and recovery uranium are used as the fuel material.

The fuel assemblies comprise at least a normal fuel assembly and a partial fuel assembly having an exothermic portion length shorter than that of the normal fuel assembly, and the fuel assembly has an exothermic portion of a maximum length of 2 m or less and the partial fuel assembly has an exothermic portion of a maximum length of 1 m or less. The normal fuel assembly has upper and lower portions to which shaft brackets are provided and the partial fuel assembly has upper and lower portions to at least one of which a shaft bracket is not provided.

In another aspect, there is provided a reactor core including a number of fuel assemblies each having a cylindrical channel box and a fuel bundle disposed therein, wherein a control rod is further provided between the fuel assemblies or in the fuel assembly to be freely withdrawal, the control rod being provided with a control rod absorber having a hollow follower at upper or lower portion thereof for preventing a coolant from flowing when the control rod is withdrawn.

In this aspect, the fuel assemblies have an arrangement of four fuel assemblies adjacent to each other and the control rod has a cross-shaped cross section and is disposed between the four fuel assemblies so as to be freely withdrawal from a lower side thereof, the control rod being formed with a follower at an upper portion thereof which forms a coolant removal space, and a ratio of the number of control rods to the number of fuel assemblies charged in the reactor core is set to be substantially 1:1.

In a further aspect, there is provided a reactor core including a number of fuel assemblies charged therein, wherein the fuel assemblies comprise a normal fuel assembly having a predetermined fuel effective exothermic portion and a partial fuel assembly having an exothermic portion having a length shorter than that of the normal fuel assembly, the partial fuel assembly being provided, at an upper portion thereof, with a hermetic container which is filled with a sealed gas.

In this aspect, the hermetic container is formed of aluminum, zirconium or zircaloy having a small neutron absorption cross section. The fuel assembly is composed of a cylindrical channel box and a fuel bundle disposed in the channel box, the fuel bundle including a plurality of fuel rods and being provided with a coolant removal rod at a central portion between adjacent three or four fuel rods.

The coolant removal rod has an inner hollow structure, and the coolant removal rod is formed of aluminum, zircaloy or zirconium having a small neutron absorption cross section. The fuel assembly is provided with a support pad disposed at four corner portions of an upper portion of the channel box so as to ride on each of the corner portions from an outer side thereof and upper portions of adjacent fuel assemblies are supported by means of the support pads in a transverse direction. The fuel assembly is composed of a cylindrical channel box and a fuel bundle disposed in the channel box, the fuel bundle including a number of fuel rods formed into a bundle by means of a fuel spacer so as to provide a triangular shape, the channel box being provided with an inner side portion covering the fuel bundle, and a protrusion which corresponds to unevenness of an outer periphery of the fuel bundle is formed to the inner side portion of the channel box. The channel box is provided with an outer side portion to which a protrusion for removing a coolant is formed.

In a still further aspect, there is provided a reactor core including a number of fuel assemblies charged therein, wherein the fuel assemblies are composed of cylindrical channel boxes each having an inner space being divided into a normal fuel element region and a partial fuel element region by means of a coolant channel partition wall. The normal fuel element region is formed so that a normal fuel element having a predetermined fuel effective length is arranged and the partial fuel element region is formed so that a short-dimension fuel element having a fuel effective length shorter than that of the normal fuel element is arranged and a distribution of coolant flow rate to the normal fuel element region and the partial fuel element region is carried out by means of an orifice provided on a lower portion of the fuel assembly.

According to the present invention of the characters and structures mentioned above, the fuel pins constituting the fuel bundle are arranged so as to provide a triangular shape, so that the arrangement density of fuel pins can be improved. Further, the ratio of the coolant channel cross section to the fuel cross section is set to 1 or less, which is considerably smaller as compared with the conventional ratio, so that the average neutron energy can be made close to the sodium cooling water type fast breeder reactor. As a result, a ratio of neutron capture reaction of the fissionable material is small, and the number of neutrons generated per neutron absorption is increased. Thus, the number of neutrons absorbed in the parent material becomes much, so that the breeding ratio can be set to about 1, and also, a utilization factor of uranium resource can be greatly improved.

The arrangement pitch of the fuel assembly is about 300 mm or more so that the fuel assembly has a large diameter. Accordingly, it is possible to lower the ratio of water in the gap between the fuel assemblies to the overall volume and to lower the ratio of water to fuel, so that the breeding ratio can be increased.

The channel box is provided with the protrusion (projection) at the outer side thereof, so that the water removal space is ensured in the reactor core and the ratio of water to fuel can be lowered and also provided with the support pad at the upper portion thereof, so that the upper lattice plate can be dispensed and the gap between the fuel assemblies can be made small. Therefore, the fuel volume ratio is increased, and the ratio of water to fuel is lowered, thus increasing the breeding ratio.

Since the fuel bundle housed in the channel box is supported by means of the grid spacer so that fuel rods are arranged to provide a triangular shape, the fuel assembly is safely secured and the fuel rods are closely arranged. Thus, the fuel volume ratio is increased and the ratio of water to fuel is increased, also increasing the breeding ratio.

Since the grid of the grid spacer is provided with the vibration preventive spring and the fuel rod is elastically and stably held by means of the vibration preventive spring, the fuel assembly can be safely secured. Further, the grid and the vibration preventive spring are formed integrally with each other, and thereby, the number of components can be reduced, and molding process is easily performed. Since the grid is formed of stainless steel or inconell, the grid can be made thin and mechanical and physical strength can be sufficiently maintained even if the grid is made thin.

Since at least one of the channel box and the fuel coating tube is formed of stainless steel, the wall thickness is made thin, and the fuel volume ratio is increased, and the ratio of water to fuel is lowered to increase the breeding ratio.

Since plutonium and recovery uranium are used as the fuel material, the number of neutron generated from materials other than plutonium can be increased, thus increasing the breeding ratio.

Since the normal fuel assembly and the partial fuel assembly are arranged, in the case where the output power of reactor core raises up to increase the void reactivity, the neutron generated in the reactor core leaks out on the upper portion (or lower portion) of the reactor core through the streaming path, so that the void reactivity can be made negative. Therefore, inherent stability and environmental protection can be achieved.

Since the normal fuel assembly has a maximum exothermic portion of the length which is 2 m or less, and the partial fuel assembly has a maximum exothermic portion of the length which is 1 m or less, even if the reactor core has the same core diametrical direction size as the conventional light water cooling reactor, the void reactivity can be made negative.

Since the normal fuel assembly is provided with the shaft brackets so as to absorb the neutron leaking from the reactor core and, on the other hand, the shaft bracket is not provided on at least one of upper and lower portions of the partial fuel assembly so as to increase the neutron leakage when the void reactivity increases, whereby the breeding ratio can be increased and the void reactivity can be made negative even if the reactor core has the same core diametrical direction size as the conventional reactor core. Therefore, environmental protection, safety and reliability can be improved.

Since the control rod is provided with a hollow follower for preventing a coolant from flowing into the reactor core when being taken out, it is possible to lower the ratio of water in the gap between fuel assemblies or the gap in the fuel assemblies to the overall volume and the ratio of water to fuel is lowered, thus increasing the breeding ratio.

The control rod having a cross-shaped cross section is provided between four fuel assemblies adjacent to each other so as to be freely withdrawal from the lower portion thereof, and each control rod is formed with a follower which forms a water removal space at the upper portion thereof, and further, a ratio of the number of control rods to the number of fuel assemblies charged in the reactor core is set so as to be substantially 1:1. Accordingly, the fuel assembly has a large diameter, and the fuel volume ratio is increased and the ratio of water to fuel is lowered, so that the breeding ratio can be increased to at least about 1.

Since the partial fuel assembly is provided with a hermetic container which is filled with a sealed gas, at the upper portion thereof, the streaming path is formed on the upper portion of the partial fuel assembly so that the leakage of neutron in the axial direction of the reactor core can be facilitated. Therefore, the breeding ratio is increased, and simultaneously, the void reactivity is lowered, so that the void reactivity can be made negative.

Since the hermetic container provided on the upper portion of the partial fuel assembly is formed of aluminum, zirconium or zircaloy having a small neutron absorption cross section, the neutron absorption in the hermetic container is decreased and the neutron absorption of U-238 of the nuclear material is relatively increased, so that the breeding ratio can be increased and the void reactivity can be lowered.

Since the coolant removal rod is provided on the gap between the fuel rods of the fuel assembly, the coolant can be removed by means of the coolant removal rod, and the volume ratio of water to fuel is decreased, so that the void reactivity can be lowered.

Since the coolant removal rod has an inner hollow structure, the neutron absorption is decreased by the coolant removal rod, and the neutron is relatively absorbed in the nuclear material such as U-238, so that the breeding ratio can be increased and the void reactivity can be lowered. Further, the coolant removal rod is formed of aluminum, zircaloy or zirconium having a small neutron absorption cross section, so that the breeding ratio can be further increased and the void reactivity can be lowered.

Since the support pads are provided at four corner portions of the upper portion of the cylindrical channel box so as to ride on each corner portion from an outside portion thereof, and the upper portions of the adjacent fuel assemblies are supported by means of the support pads in a transverse direction, this serves to eliminate a reactor core lattice plate. The gap between the fuel assemblies is made narrow, and as a result, the fuel volume ratio is increased and the breeding ratio can be increased. The void reactivity can be lowered. Further, the support pad serves to previously prevent the fuel assemblies from being in contact with each other and to secure a gap for inserting the control rod.

The fuel bundle housed in the fuel assembly is constructed in a manner that a number of fuel rods are made into a bundle by means of a fuel spacer so as to provide a triangular shape, and an inner side of the channel box is provided with a protrusion. Accordingly, the fuel rods are closely arranged, and the fuel volume ratio is increased. On the other hand, the protrusion serves to lower the ratio of coolant to fuel, so that the breeding ratio can be increased and the void reactivity can be lowered.

Since the outer side of the channel box is provided with a protrusion, in addition to the inner side thereof, the ratio of water to fuel is further lowered, so that the breeding ratio can be increased and the void reactivity can be lowered.

The upper portion of the partial fuel element region is voided and the streaming path of neutron is formed, so that the void reactivity can be lowered and made negative.

The distribution of coolant flow rate to the normal fuel element region and the partial fuel element region is properly carried out by means of an orifice provided on an lower portion of the fuel assembly.

The nature and further characteristic features will be made more clear from the following descriptions made with reference to the accompanying drawings.

DESCRIPTION OF THE PREFERRED EMBODIMENTS

A reactor core according to preferred embodiments of the present invention will be described hereunder with reference to the accompanying drawings.

Figure 1:
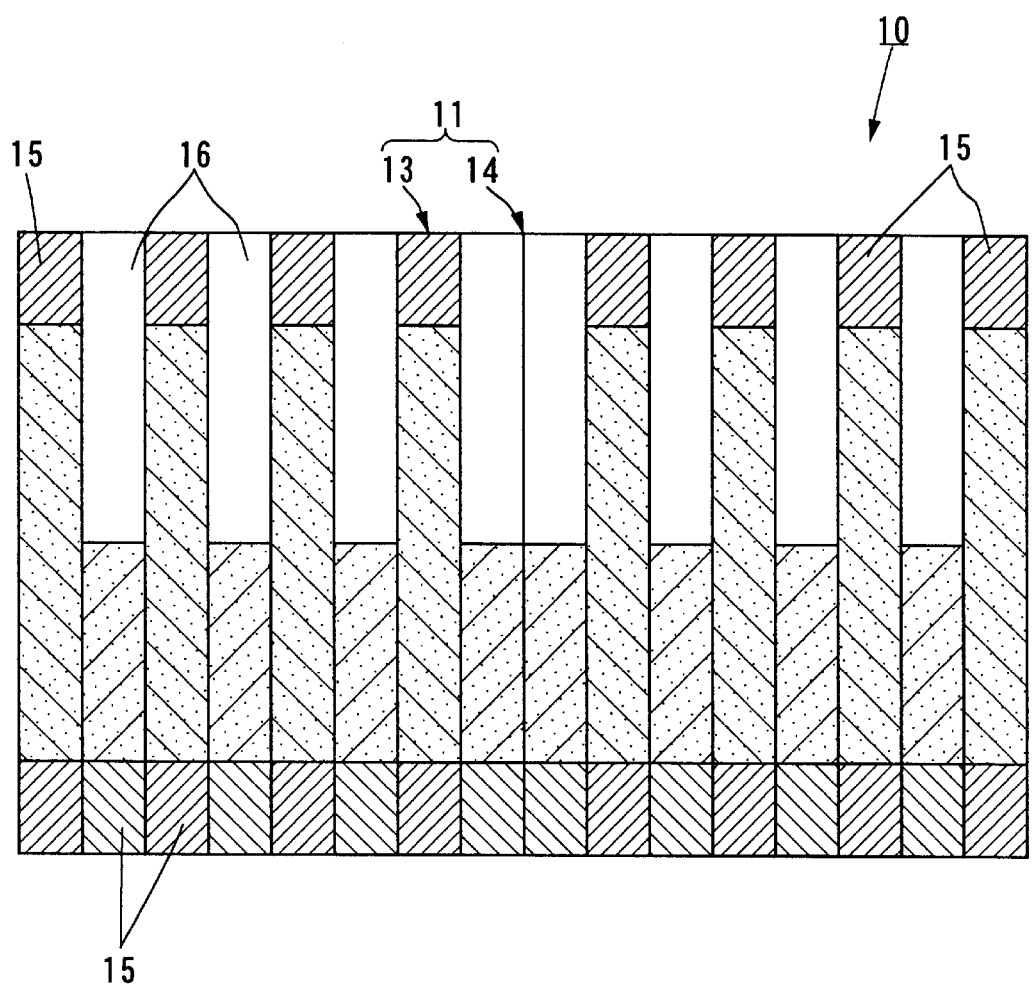
FIG. 1 is a longitudinally sectional view theoretically showing a first embodiment of a reactor core according to the present invention.
Figure 2:
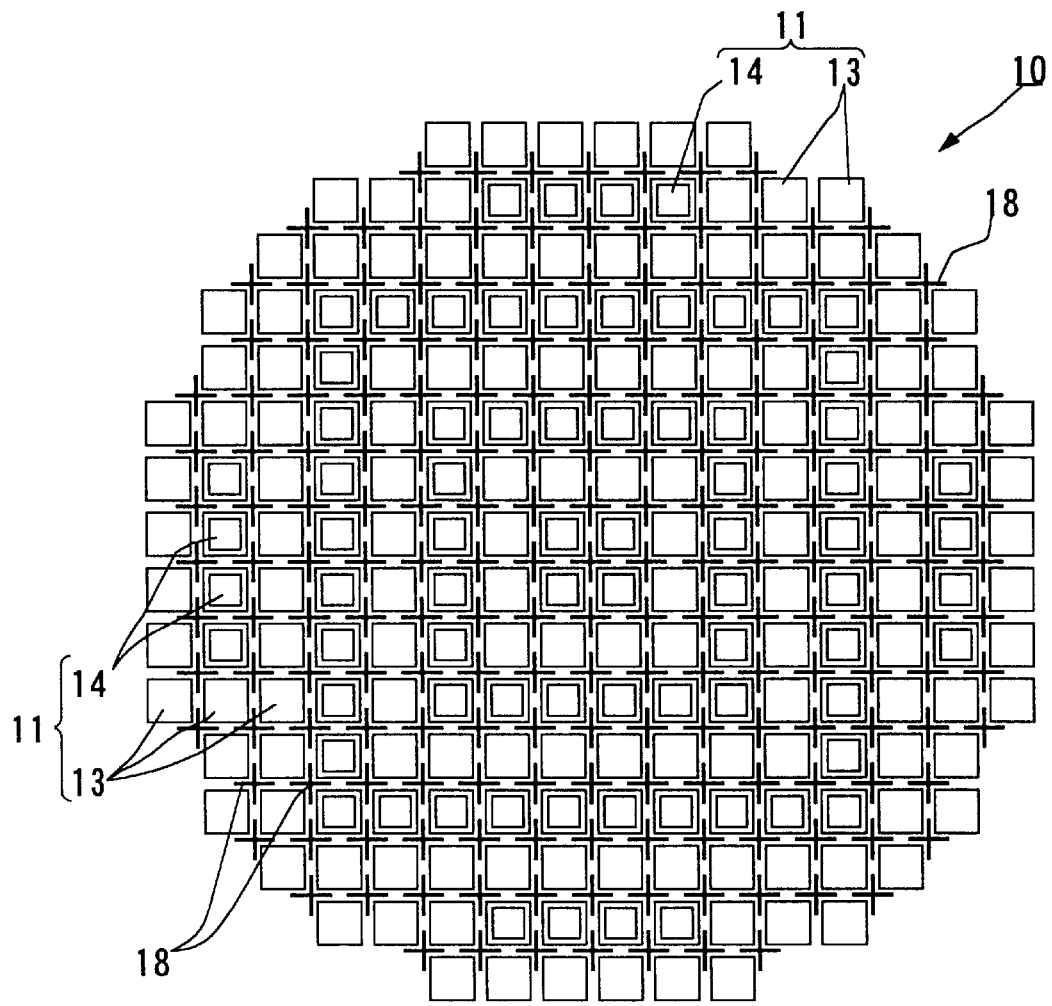
FIG. 2 is a top plan view of the reactor core shown in FIG. 1.

As mentioned above, FIG. 1 is a longitudinally sectional view theoretically showing a first embodiment of a reactor core according to the present invention, and FIG. 2 is a top plan view of the reactor core shown in FIG. 1. FIG. 1 and FIG. 2 each show an example in which a reactor core is applied to a water cooling reactor such as a light water reactor, for example, to a boiling water reactor.

Figure 3:
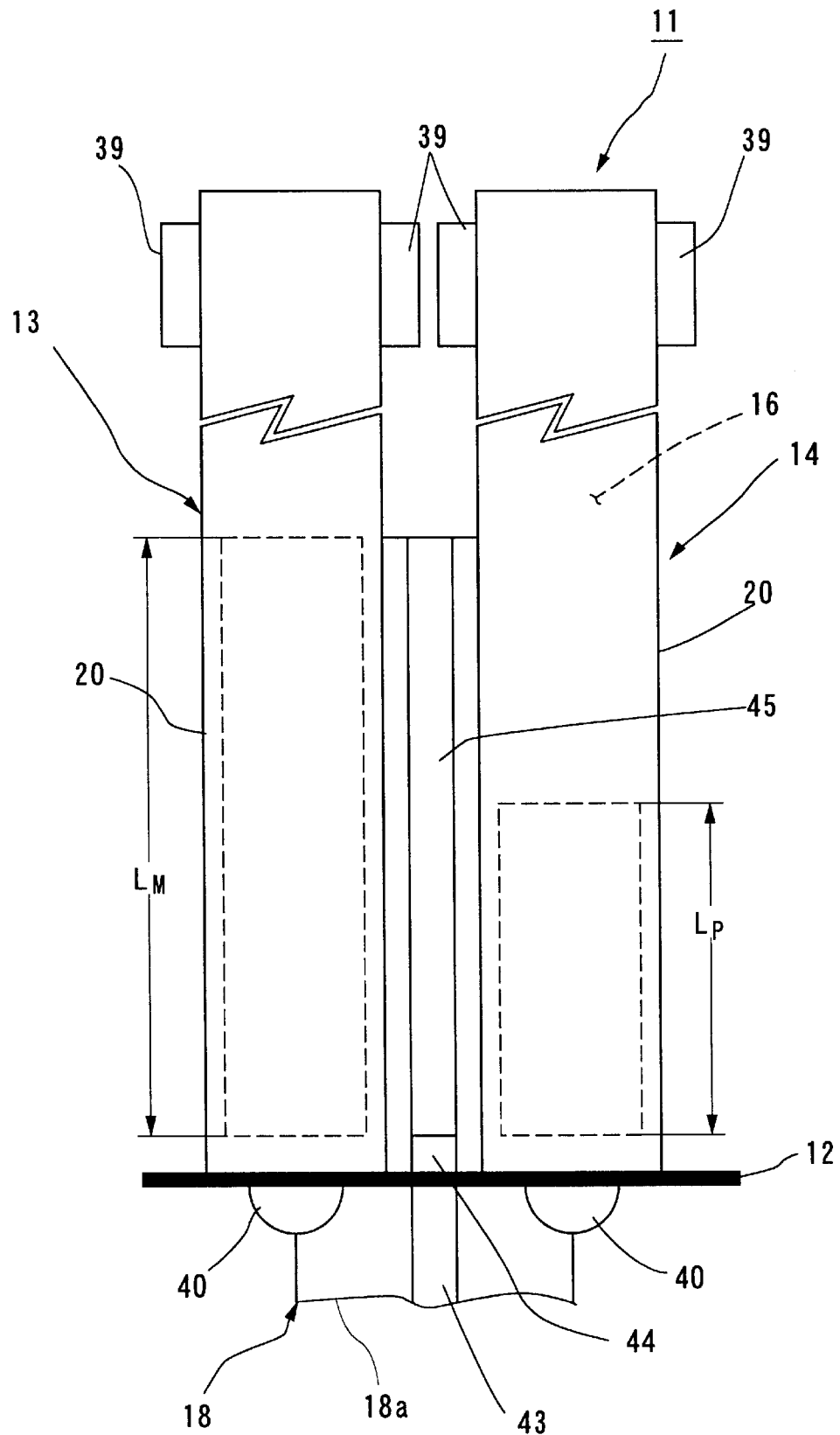
FIG. 3 shows a relationship between a fuel assembly and a control rod charged in a reactor core, and shows a state that the control rod is withdrawn.

In the boiling water reactor, a reactor core 10 is formed in a reactor pressure vessel, not shown. In this reactor core 10, rectangular cylindrical fuel assemblies 11 are charged in a manner of being arranged at an regular pitch in a longitudinal and crosswise direction, for example, at a pitch interval of 300 mm or more. The fuel assembly 11 charged in the reactor core 10 is supported on a core support plate 12 as shown in FIG. 3. Further, the fuel assembly 11 is composed of at least two kinds, that is, a normal fuel assembly 13 having a normal fuel effective (exothermic portion) length LM and a partial fuel assembly 14 having a shorter fuel effective length LP. A plural kinds of the partial fuel assemblies 14 may be prepared in accordance with the fuel effective length LP. As shown in FIG. 1, shaft brackets 15, each having a length of about 20 to 30 cm, are provided on upper and lower portions of the normal fuel assemblies 13 and on a lower potion of the partial fuel assembly 14. The upper portion of the partial fuel assembly 14 is formed with a streaming path 16 and the shaft bracket is not provided thereon.

In the reactor core 10 of the boiling water reactor, the normal fuel assemblies 13 and the partial fuel assemblies 14 are dispersively arranged alternately in a diametrical direction thereof at a predetermined arrangement pattern. These normal fuel assemblies 13 and partial fuel assemblies 14 may be also dispersively arranged alternately in the diametrical direction and the circumferential direction. Therefore, various arrangement patterns may be considered. However, it is desirable that four fuel assemblies 11, which should be arranged on the central portion of the reactor core 10, are composed of the partial fuel assemblies 14, and it is desirable that the fuel assemblies which should be arranged on the outermost circumference are the normal fuel assemblies 13.

Figure 4:
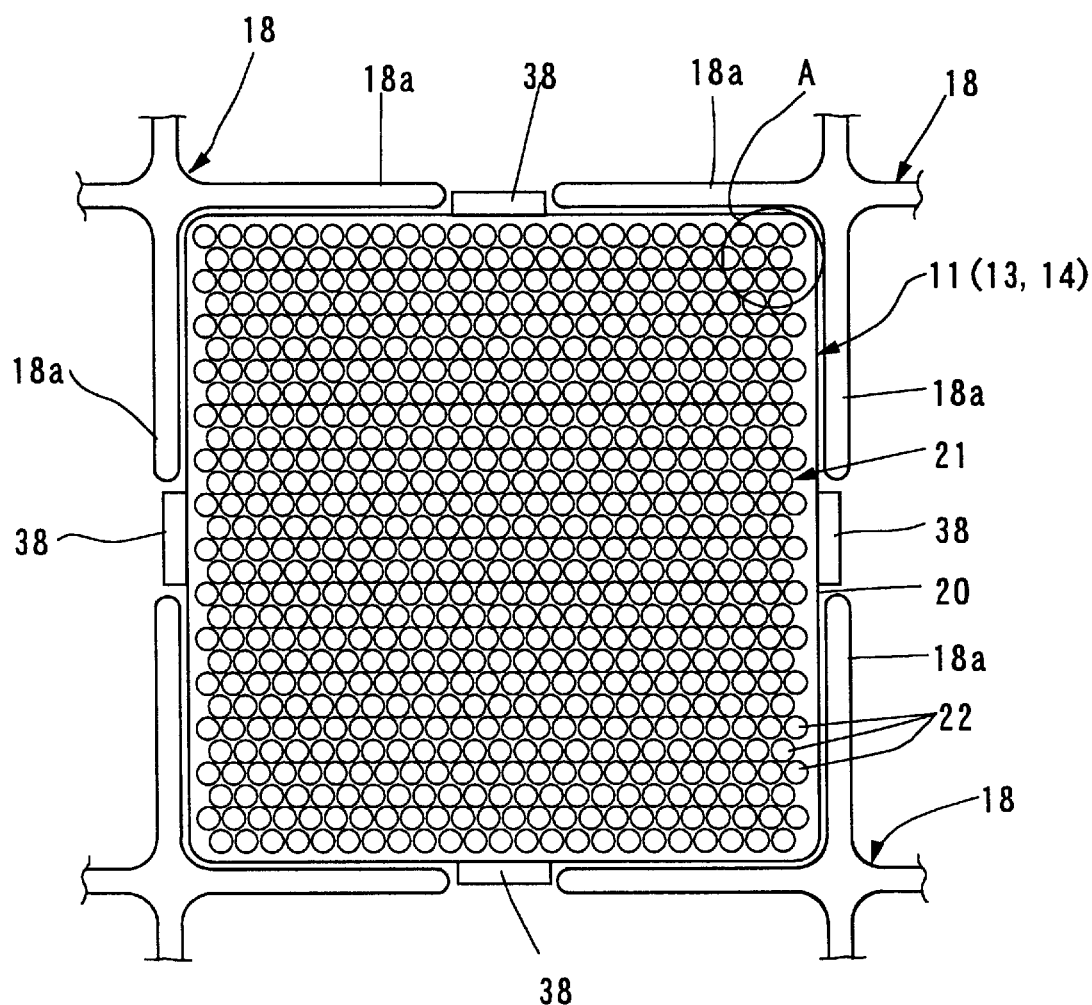
FIG. 4 is a top plan view showing an arrangement between the fuel assembly and the control rod.

In the reactor core 10 of the boiling water reactor, the normal fuel assemblies 13 and the partial fuel assemblies 14 are charged in a state of being properly combined with each other. A control rod 18 having a cross-shaped traverse section is provided between four fuel assemblies 11 adjacent to each other so as to be taken in and out. Moreover, as shown in FIG. 4, the fuel assemblies 11 are arranged in a substantially square space defined by four control rods 18 adjacent to each other. A blade 18a constituting the control rod 18 is taken in and out so as to surround the fuel assembly 11.

In the fuel assembly 11, the normal fuel assembly 13 and the partial fuel assembly 14 have the same plane structure as shown in FIG. 4. FIG. 4 is a view showing an upper surface of the fuel assembly 11. The fuel assembly 11 has an area size of several times, for example, four times, as much as the existing fuel assembly. Thus, the arrangement pitch of the fuel assembly 11 is wide, and for example, the fuel assembly having the four-times area size has an arrangement pitch of about 300 mm or more. The fuel assembly 11 itself is made larger than the existing fuel assembly, and thereby, the coolant in a gap between fuel assemblies 11 is reduced so as to lower a ratio of water serving as a coolant, with respect to the overall volume. Further, a ratio of water to fuel is lowered so that a breeding ratio is set to at least about 1, for example, to 1.0 to 1.1.

Figure 5:
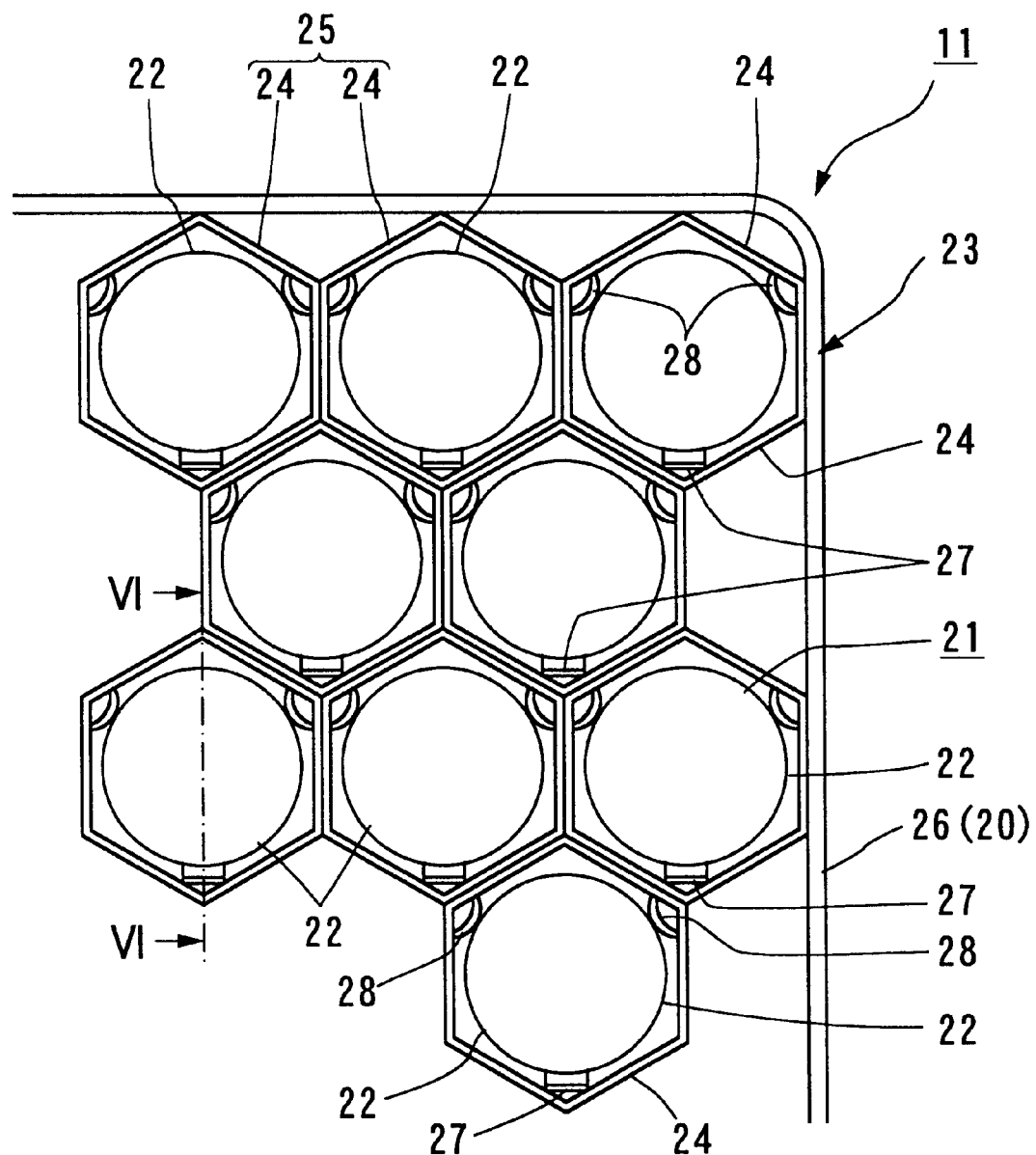
FIG. 5 is a partially enlarged plan view showing a portion A shown in FIG. 4.

As shown in FIG. 4, in the fuel assembly 11, a fuel bundle 21 is housed in a cylindrical channel box 20 as a rectangular outer housing. The fuel bundle 21 is a fuel element bundle which has, as a whole, a rectangular, e.g., square transverse section. A seal alloy or stainless steel material is used as a material for the channel box 20. In the fuel bundle 21, a number of fuel rods (fuel pins) 22 are closely arranged with a predetermined regularity, and is made into a bundle by means of a fuel spacer, e.g., a grid spacer 23 as shown in FIG. 5 so that an interval between fuel rods 22 is retained. A plurality of the grid spacers 23 are provided at a predetermined interval in a longitudinal direction of the fuel bundle 21.

If the channel box 20 is formed of stainless steel, the channel box 20 has mechanical and physical strength larger than the channel box made of seal alloy used in the existing light water reactor. For this reason, the channel box 20 has high rigidity, so that the channel box 20 can be made thin. The thickness of the channel box made of stainless steel is set to about 3 mm to 5 mm, preferably, to about 3 mm. As described above, the channel box 20 is made thin, and a fuel volumetric ratio can be hence increased, and a ratio of water to the fuel can be lowered.

The fuel bundle 21 housed in the channel box 20 is constructed in a manner that a number of fuel rods 22 are made into bundle. The grid spacer 23 bundling up the fuel rods 22 includes a thin hexagonal cylinder having a thickness of about 0.2 mm, or a honeycomb type grid lattice 25 which is constructed in a manner that many rectangular and cylindrical sleeves 24 as pipe-like grid structure are fixed and integrated in a state of being closely arranged in its plane. The rectangular cylindrical sleeve 24 is formed of stainless steel or inconell having high rigidity and high mechanical and physical strength. Moreover, the grid spacer 23 may be constructed in a manner of surrounding the outer peripheral side of the honeycomb type grid lattice 25 by a rectangular outer frame 26 which functions as a reinforcing frame 26, or the grid spacer 23 may be constructed by the honeycomb type grid lattice 25 having no outer frame.

One corner portion of the rectangular cylindrical sleeve 24 of the honeycomb type grid lattice 25 is provided with a vibration preventive spring 27. The vibration preventive spring 27 comprises a spring member such as a flat spring or a rod spring, which is bent into a V-letter or arc shape and has the entire length of about 15 mm. Upper and lower ends of the vibration preventive spring 27 are welded to an inner wall surface of the corner portion of the rectangular cylindrical sleeve 24, and an intermediate portion of the spring elastically projects into the cylindrical sleeve 24.

Further, the cylindrical sleeve 24 of the honeycomb type grid lattice 25 is provided with a pair of protrusions (projections) 28 on a symmetrical position separated from the vibration preventive spring 27 at an angle of 120°. The protrusion 28 bulges like an arc from the corner portion of the rectangular cylindrical sleeve 24 to the inside thereof. Moreover, the protrusion 28 may be formed as a dimple which is recessed on a side face of the corner portion of the cylindrical sleeve 24 and projects into the sleeve. Further, the protrusion 28 may be formed in the following manner. Specifically, cut portions extending to the circumferential direction are formed to upper and lower portions of the corner portion of the rectangular cylindrical sleeve 24, and then, the cut portion having a up-and-down predetermined width is inwardly pressed and deformed so as to be bulged.

The fuel rod 22, which is nuclear fuel element, is successively guided into each sleeve 24 of the honeycomb type grid lattice 25 constituting the grid spacer 23, and then, inserted fuel rod 22 is supported at three points by means of the paired protrusions 28 and the vibration preventive spring 27 so as to prevent fuel rods 22 from contacting with each other, thus constituting the fuel bundle 21. In the fuel bundle 21 thus constructed, each fuel rod 22 is held at a predetermined interval by means of the paired protrusions 28 and the vibration preventive spring 27, and a coolant channel is secured therein, whereby each fuel rod 22 is restricted from vibrating and a fuel can be previously and securely prevented from being broken down.

Figure 6:
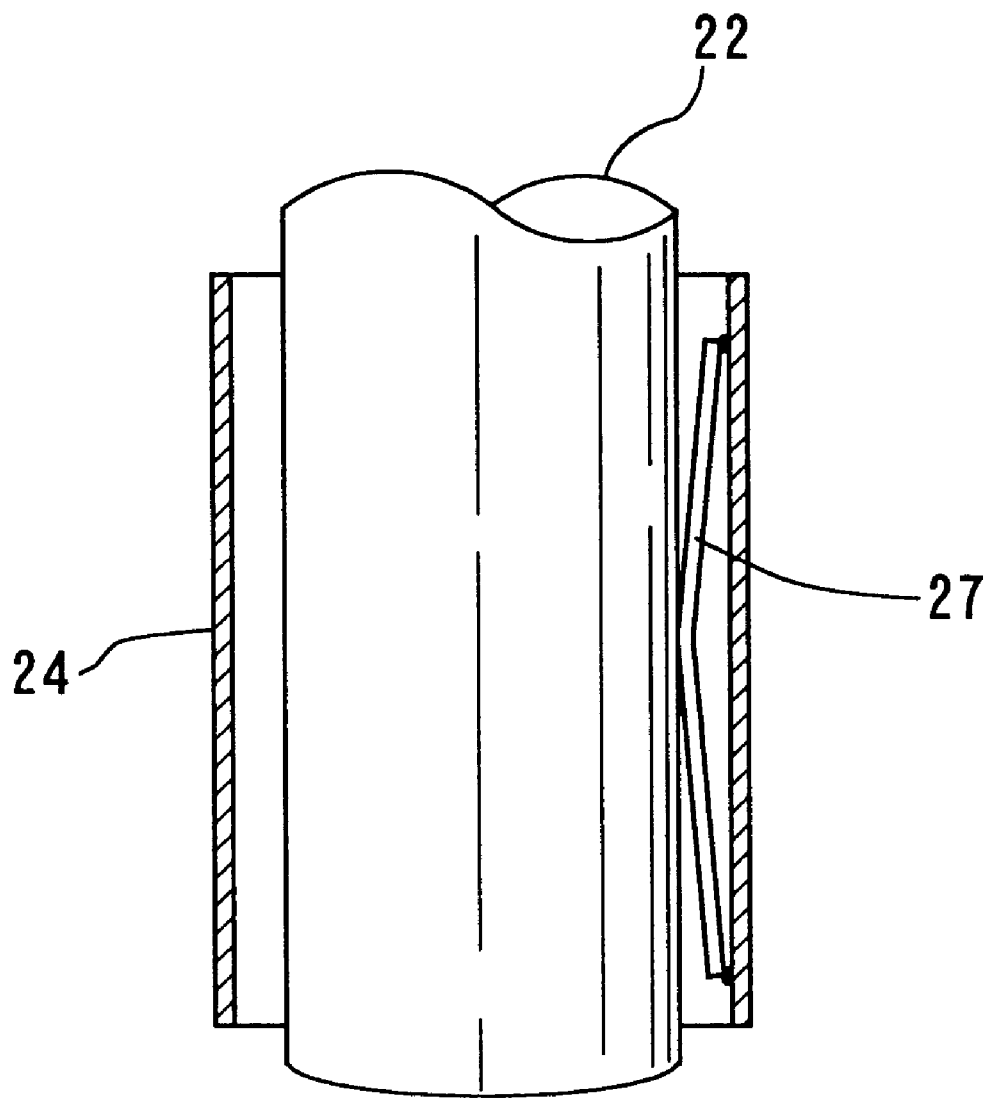
FIG. 6 is a longitudinally sectional view taken along the line VI—VI of FIG. 5.
Figure 7:
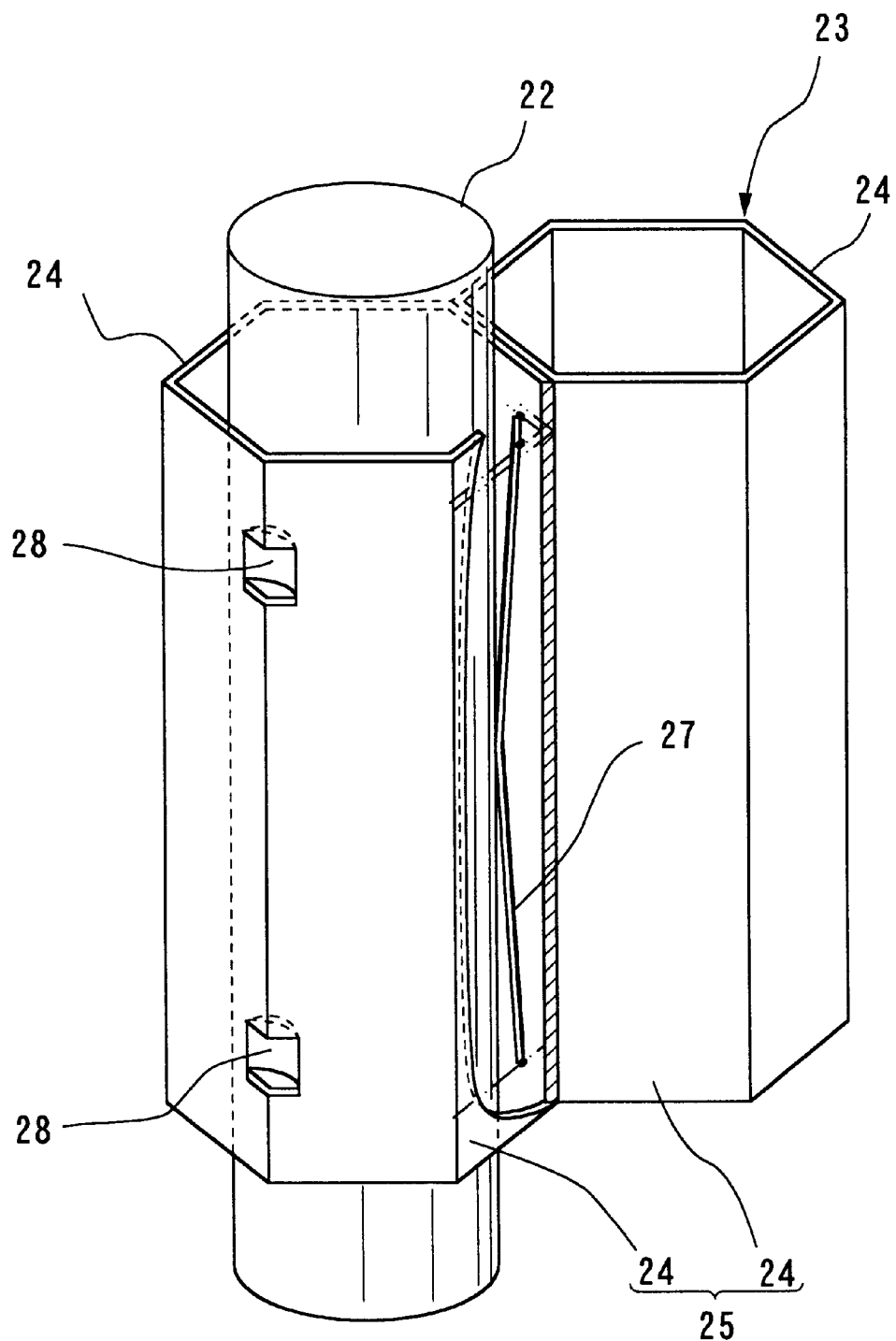
FIG. 7 is a perspective view partially showing a grid spacer which is used as a fuel rod.
Figure 8:
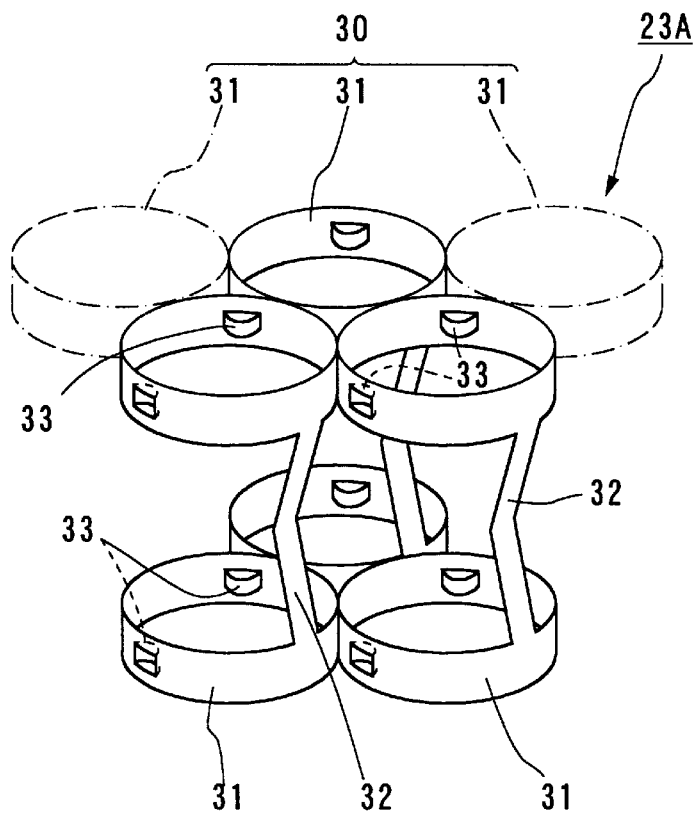
FIG. 8 shows a modified example of a grid spacer for making a bundle of fuel rod and is a perspective view partially showing a spring integral-type spacer.

As shown in FIG. 5 to FIG. 7, the honeycomb type grid lattice 25 has been constructed by integrally combining the cylindrical sleeve 24 and the vibration preventive spring 27. In place of the honeycomb type grid lattice 25, a grid spacer 23A as shown in FIG. 8 may be used. The grid spacer 23A comprises a spring-integral type grid lattice 30 which integrally combines a ring-like or tours-like upper and lower circular guide 31 constituting a grid and a vibration preventive spring 32. The circular guide 31 constitutes a grid of the grid spacer 23A. Further, a reference numeral 33 denotes a protrusion which is formed at the circular guide 31 of the spring-integral type grid lattice 30. It is desirable that the paired protrusions 33 and the vibration preventive spring 32 are provided at a 120° angular interval. However, these paired protrusions 33 and vibration preventive spring 32 are not necessarily provided at the 120° angular interval, and a degree of freedom of angle is given when providing them.

Figure 9:
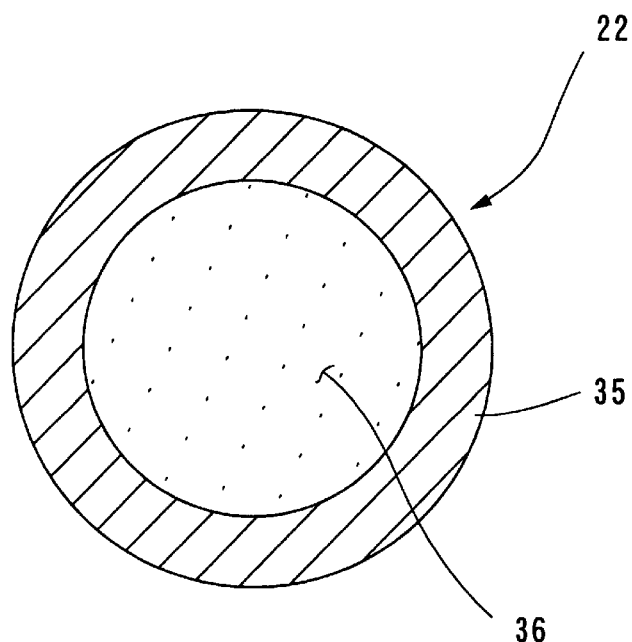
FIG. 9 is a horizontally sectional view showing a fuel pin constituting a fuel bundle of the fuel assembly.

In a number of fuel rods (fuel pin) 22 constituting the fuel bundle 21, as shown in FIG. 9, a fuel cladding tube 35 is filled with a nuclear fuel material 36 (fissionable material) which is a pellet or particle size fuel material. Plutonium and recovery uranium are used as the fuel material which is the nuclear fuel material. Further, as conventionally made, natural uranium or depleted uranium may be mixed with plutonium. However, in the case where the aforesaid plutonium and recovery uranium are used as the fuel material, the number of neutrons generated from materials other than plutonium is increased, so that a breeding ratio can be made high.

The fuel rods of the fuel bundle 21 is formed into a triangular arrangement so as to improve a filling density of fuel rods 22. For example, the fuel rods 22 are arranged by relatively shifting them by a fuel rod single pitch in a column direction in a manner such that that an even-column fuel rod 22 is positioned between odd-column fuel rods. In this manner, three fuel rods adjacent to each other are closely arranged so as to form an equilateral triangle. In this fuel bundle 21, the even-column fuel rod 22 is relatively shifted by only half pitch in the column direction with respect to the odd-column fuel rod 22. The relative shift serves to make small a fuel rod pitch in a line direction, further improving the arrangement density of the fuel rods 22.

The odd-column fuel rod 22 has been relatively shifted by the half pitch with respect to the even-column fuel rod 22. In place of doing so, even if the odd-column fuel rod 22 is relatively shifted by only half pitch in the line direction with respect to the odd-column fuel rod 22, substantially the same effect as that described above will be obtainable.

Since the fuel rods 22 constituting the fuel bundle 21 has a triangular arrangement structure, these fuel rods 22 can be closely arranged and the filling density of fuel can be improved as compared with a square arrangement structure in which fuel rods 22 are arranged in a lined-up form in longitudinal and traverse directions, i.e. column and line directions.

The existing zirconium alloy (zircaloy) material or stainless steel material is used as the material for the fuel cladding tube 35 of the fuel rod 22. In the case where the stainless steel having high mechanical and physical strength is used in place of the existing zirconium alloy (zircaloy) material, a wall thickness of the fuel cladding tube 35 can be made thin. In the case of using the fuel cladding tube 35 made of stainless steel, when a fuel rod diameter is 10 mm$\phi$, the wall thickness of the fuel cladding tube is set to 0.25 mm to 0.4 mm, preferably, to a degree of 0.3 mm. Therefore, the wall thickness can be made thinner as compared with about 0.5 mm in the case of using zirconium alloy.

As described above, the wall thickness of the fuel cladding tube 35 is made thin, which serves to increase the fuel volume ratio and the ratio of water to the fuel is lowered, and the ratio, thus being applicable to the reactor core 10 whose breeding ratio is at least about 1. The reactor core 10 is one applicable for a fast spectral reactor. Therefore, even if the stainless steel is used, the neutron absorption by the structural material is small like the case of zirconium alloy used in the existing light water reactor.

The fuel assemblies 11 are composed of the normal fuel assemblies 13 and the partial fuel assemblies 14 as shown in FIG. 1 to FIG. 3. The control rod 18 having a cross-shaped traverse section is provided between the four fuel assemblies 11 adjacent to each other so as to be freely taken in and out. As shown in FIG. 4, a protrusion 38 is provided on the central portion at which the blade 18a of the control rod 18 does not reach in the gap defined between the fuel assemblies 11. The protrusion 38 is provided on the central portion of the outer side of the channel box 20 along the longitudinal direction thereof. Further, the protrusion 38 constitutes a water removal space to lower the ratio of water to fuel. The interior of the protrusion 38 may be formed into a hollow, and as described above, since the protrusion 38 is provided, or the interior of the protrusion 38 is formed so as to provide a hollow structure, the breeding ratio can be increased and a void reactivity can be reduced.

The channel box 20 of the fuel assembly 11 is provided with a support pad 39 at an outer side on the upper portion thereof. The support pads 39 are provided at four portions on the outer side of the channel box 20. These support pads 39 serve to dispense an upper lattice plate which functions as a fuel assembly fixing frame used in the existing light water reactor and also serve to make small a gap defined between fuel assemblies 11. Therefore, it is possible to increase a fuel volume ratio and to lower the ratio of water to fuel. In FIG. 3, a reference numeral 40 denotes an orifice for guiding the coolant into the fuel assembly 11.

Further, in the reactor core 10, the partial fuel assemblies 14 and the normal fuel assemblies 13 are arranged in combination with each other. According to this arrangement, if a reactor power output rises up and the void reactivity increases, neutrons generated in the reactor core 10 leak out at an upper portion of the reactor core through the streaming path 16 of the partial fuel assembly 14. In this manner, the neutron leakage effect is obtained in the core axial direction, and thereby, the void reactivity can be made negative.

The partial fuel assembly 14 is a fuel assembly which has a fuel effective length LP of an exothermic portion shorter than the height of core. The normal fuel assembly 13 is an ordinary fuel assembly which has a predetermined fuel effective length LM and is substantially equal to a fuel effective height of core. In the case where the entire length of the fuel assembly 11 is approximately 4 m, the maximum length (fuel effective length) LM of the exothermic portion of the normal fuel assembly 13 is set to, for example, 2 m or less. On the other hand, the maximum length (fuel effective length) LP of the exothermic portion of the partial fuel assembly 14 is set to, for example, 1 m or less. According to this arrangement, the core diametrical direction size is made the same as the conventional light water reactor while the void reactivity being made negative.

Figure 10:
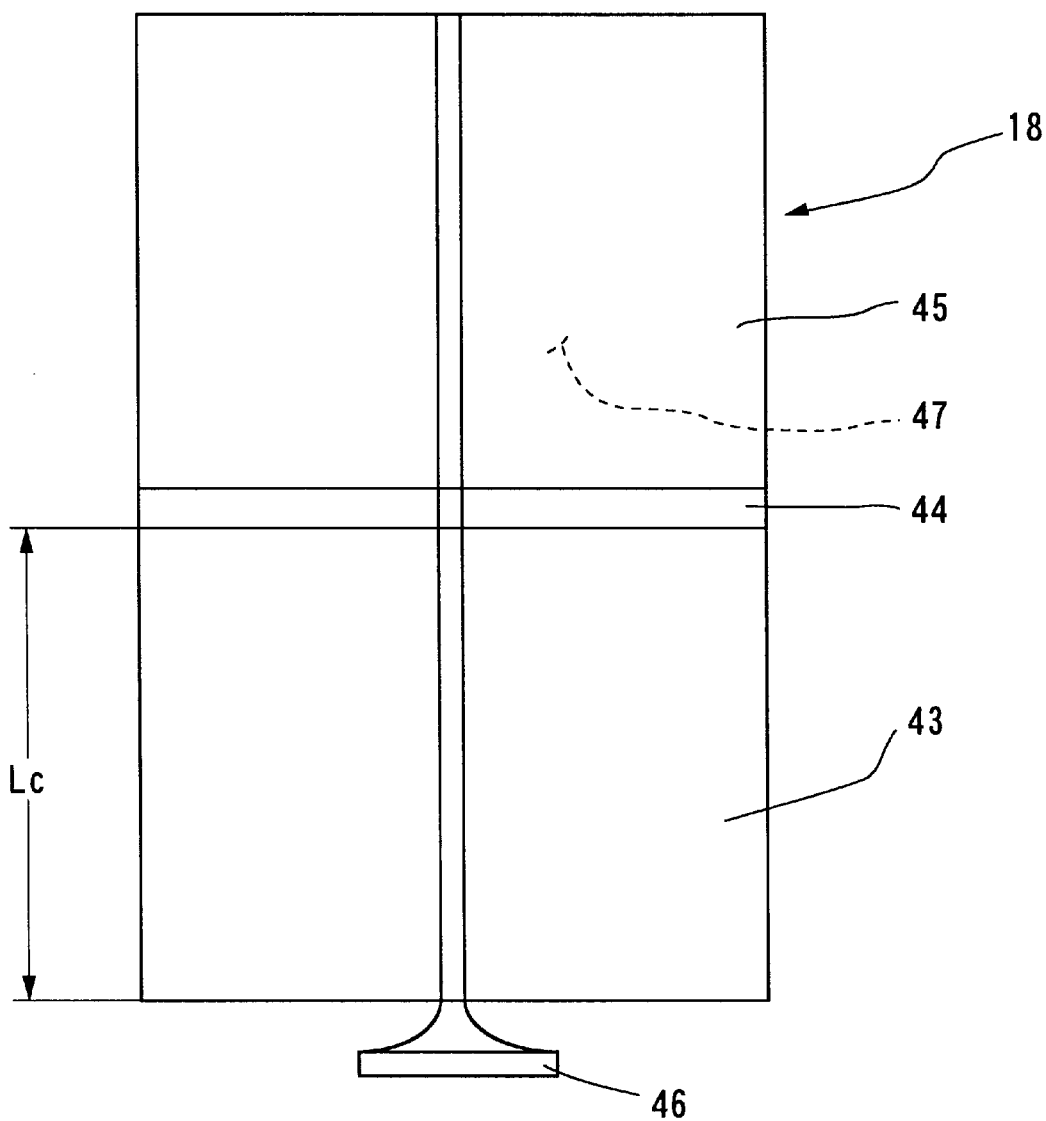
FIG. 10 is a side view showing a control rod which is inset between fuel assemblies charged in the reactor core so as to be freely taken in and out.

The control rod 18, which is inserted between the fuel assemblies in four groups so as to be freely taken in and out, is constructed as shown in FIG. 10. The control rod 18 has the entire length equal to the entire length of the fuel assembly 11 of, for example, about 4 m. A neutron absorption substance such as $B_4C$, hafnium or the like is stored in a lower half portion of the control rod 18. The lower half portion of the control rod 18 is constructed as a control rod absorber 43. A follower 45 is formed on the upper portion of the control rod absorber 43 through an intermediate partition plate 44 having a hollow structure. The intermediate partition plate 44 is formed of stainless steel, for example. A reference numeral 46 denotes a supporting portion of the control rod 18.

The follower 45 is formed of a thin-walled steel plate and is formed with a flat hermetic (sealed) space 47 having an interior which is filled with by an inert gas such as helium or the like. This hermetic space 47 forms a water removal space. When the control rod 18 is withdrawn, as shown in FIG. 3, the follower 45 is positioned correspondingly to the fuel effective length portion (exothermic portion) LM of the fuel assembly 11 so as to prevent the coolant from flowing therein, while forming a coolant removal space. Thus, the ratio of water in the gap between the fuel assemblies 11 to the overall volume is lowered, and also, the ratio of water to fuel is lowered. The control rod absorber 43 of the control rod 18 has a length in the axial direction equivalent to the fuel effective portion (exothermic portion) LM of the normal fuel assembly 13.

Moreover, in the reactor core 10 of the boiling water reactor, the shaft brackets 15 are provided at the upper and lower portions of the normal fuel assembly 13 and at the lower portion of the partial fuel assembly 14 so as to absorb the neutrons leaking from the reactor core 10. For example, stainless steel having a neutron absorbing ability is used as the material for the shaft bracket 15.

Further, the shaft bracket 15 is not provided on the upper portion of the partial fuel assembly 14. According to such arrangement provided with no shaft bracket, a neutron leakage to the upper portion of the partial fuel assembly 14 is increased in the void increase, and the void reactivity is made negative even if the breeding ratio is at least about 1. Therefore, an inherent stability of the reactor core 10 can be ensured.

Next, the operation of the reactor core 10 of the boiling water reactor of this embodiment will be described hereunder.

The reactor core 10 has a volume ratio of water to fuel, which is less than 1, preferably, about 0.5 or less, and is remarkably smaller than the conventional reactor core of a light water reactor having a volume ratio of water to fuel, which is about 2.0 to 2.5. A ratio of coolant channel cross section to the fuel cross section of the reactor core 10 is set preferably to about 0.5 or less. Accordingly, in the reactor core 10, a fissionable material such as plutonium or the like in the fuel is subjected to a fissile reaction by a neutron, and the heat and neutrons are generated.

A part of high energy neutrons (fast neutron) produced through the fissile reaction leaks outside the reactor core 10. However, most of high energy neutrons is moderated and scattered by the water as a coolant flowing between fuel rods 22, between these fuel rods 22 and the channel box 20, and between the channel box 20 and the control rod 18, and then, are again incident upon the fuel rod 22, thus contributing to the fissile reaction or the neutron absorption reaction.

In the case where the volume ratio of water to fuel is about 0.5, a moderation (slow-down) effect by water is small, and an average neutron energy is an energy for a water cooling reactor close to sodium fast breeder reactor. For this reason, the ratio of neutron capture reaction by fissionable material is small like the existing light water reactor, and the neutron per neutron absorption is much generated, for example, two or more. Thus, the neutron absorbed in a parent material (element) such as uranium 238 (U-238) or the like is much increased, and it is possible to set the breeding ratio to about 1, preferably, to a range from 1.0 to 1.1.

In the reactor core structure mentioned above, it is possible to set the breeding ratio to at least about 1, so that a utilization (capacity) factor of uranium resource can be greatly improved. More specifically, the utilization factor is about 100 times as much as in a case of the conventional utilization factor. Thus, even in the reactor core having the same dimension as the core diametrical direction size of the conventional boiling water reactor, the void reactivity can be made negative in the overall operating range. Therefore, it is possible to obtain negative reaction feedback characteristic and to secure inherent stability. Further, effective utilization of the fuel can be achieved, and also, environmental protection and economy can be simultaneously satisfied.

Figure 11:
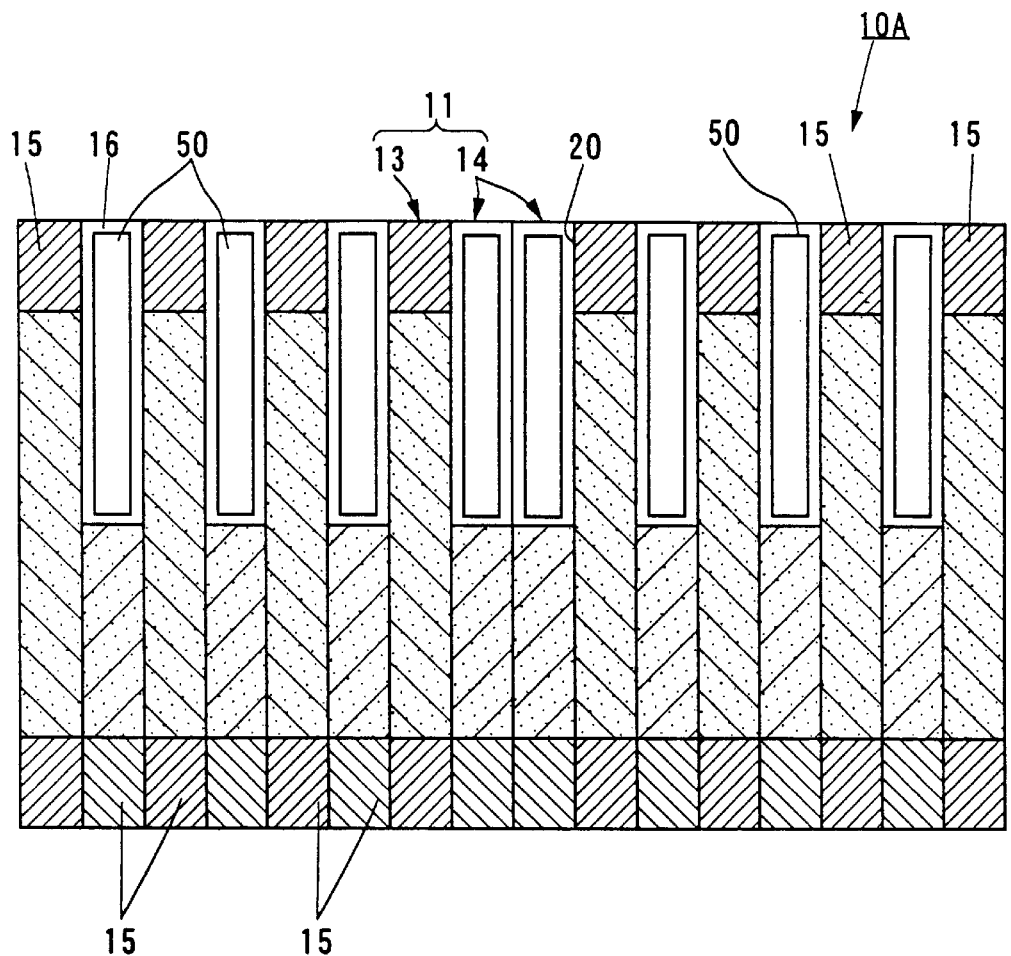
FIG. 11 is a longitudinally sectional view theoretically showing a second embodiment of a reactor core according to the present invention.

FIG. 11 shows a second embodiment of a reactor core according to the present invention.

The reactor core shown in this second embodiment is constructed in a manner that a rectangular and cylindrical hermetic container 50 is provided on an upper portion of the partial fuel assembly 14 charged in a reactor core 10A. The entire reactor core structure and the supporting structure of the fuel assembly 11 are substantially the same as those shown in FIG. 2 and FIG. 3. Therefore, like reference numerals are used to designate the same components as these of the first embodiment and their details are omitted.

The reactor core shown in FIG. 11 is applied to a water cooling reactor such as light water reactor, for example, to a boiling water reactor. In the reactor core 10A, a number of rectangular cylindrical fuel assemblies 11 are charged in a state of being arranged at an equal pitch in longitudinal and traverse direction. The fuel assemblies 11 charged in the reactor core 10A are composed of at least two kinds, that is, normal fuel assemblies 13 each having a normal fuel effective (exothermic portion) length LM and partial fuel assemblies 14 each having a shorter fuel effective length LP as shown in FIG. 3. The upper portion of the partial fuel assembly 14 is formed with a streaming path 16. The streaming path 16 is formed by providing the cylindrical hermetic container 50 used as an empty can on the upper portion of the partial fuel assembly 14.

The cylindrical hermetic container 50 is made of zirconium, zircaloy or aluminum material having a small neutron absorption cross section, and an inert gas such as helium, argon or the like is encapsulated or sealed as a seal gas in the interior thereof. As described above, the hermetic container 50 is made of zirconium, zircaloy or aluminum material, and it is therefore possible to make small a neutron collisional reaction of a neutron and the structural material of the hermetic container (hermetic container itself). Further, the hermetic container 50 is housed in the upper portion of the cylindrical channel box 20 of the partial fuel assembly 14 so as to form a water removal space.

Figure 12:
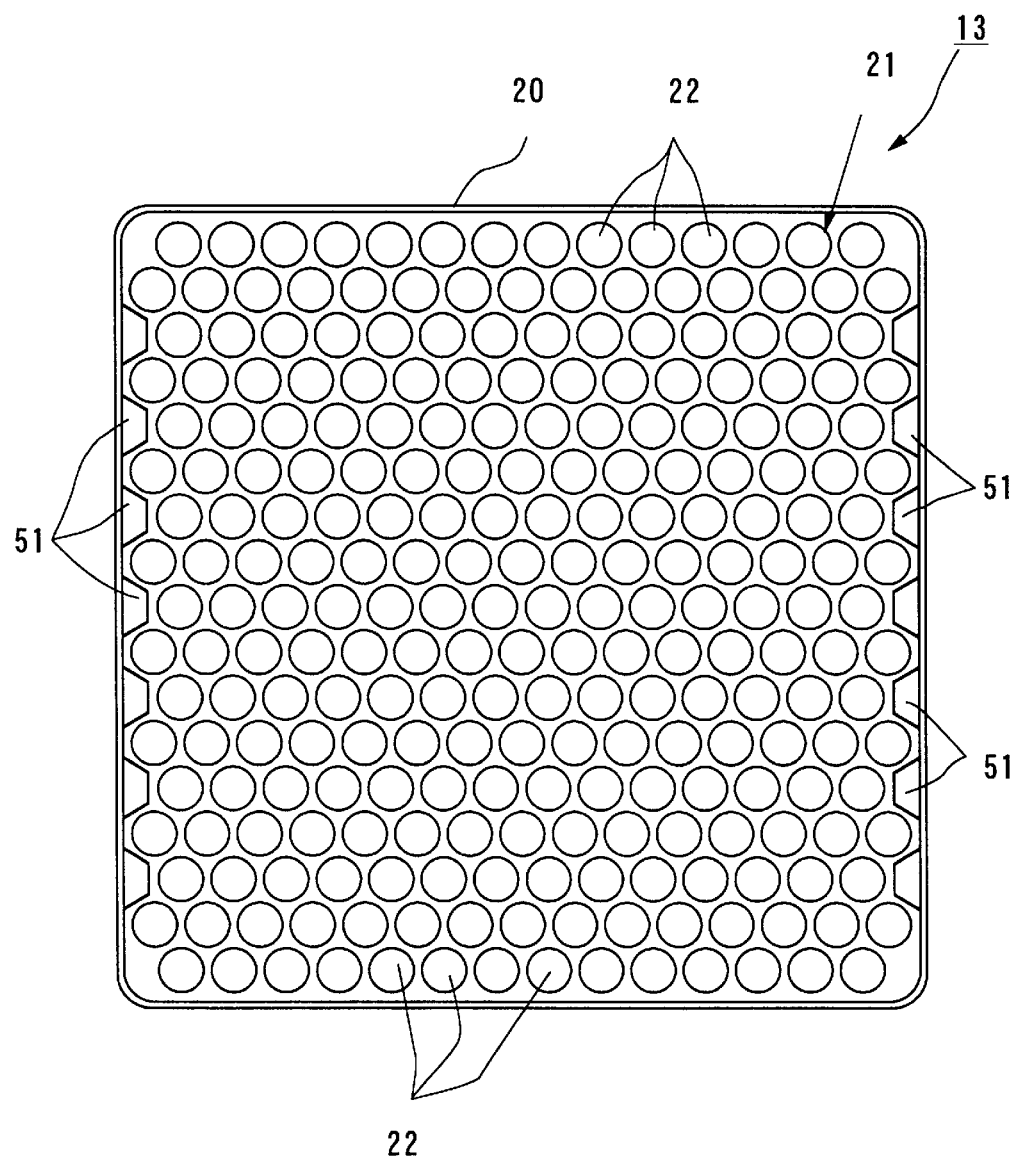
FIG. 12 is a top plan view showing a normal fuel assembly of many fuel assemblies charged in the reactor core according to the present invention.
Figure 13:
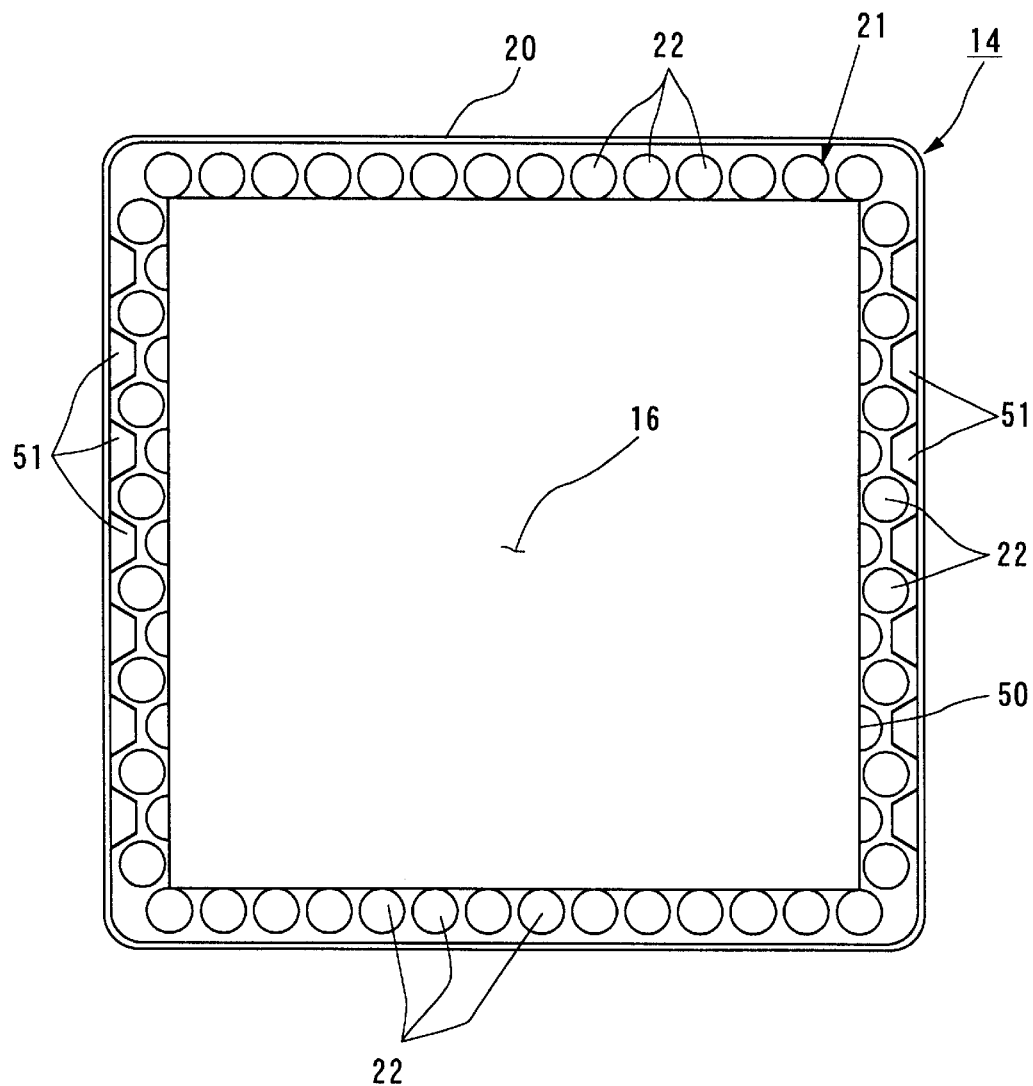
FIG. 13 is a top plan view showing a partial fuel assembly of many fuel assemblies charged in the reactor core according to the present invention.

FIG. 12 and FIG. 13 are top plan views showing the normal fuel assembly 13 and the partial fuel assembly 14 charged in the reactor core of the water cooling reactor, respectively. The normal fuel assembly 13 and the partial fuel assembly 14 of the fuel assembly 11 are housed in the channel box 20 forming as rectangular cylindrical outer housing so as to form the fuel bundle 21 as a fuel element bundle therein. In the fuel bundle 21, a large number of fuel rods 22 is formed into a bundle by means of the fuel spacer, for example, the grid spacer 25 as shown in FIG. 5 to FIG. 7 so as to form a substantially square shape in its plane and are closely arranged in the channel box 20.

The fuel bundle 21 is constructed in a manner that three fuel rods (fuel pin) adjacent to each other are arranged so as to provide an equilateral triangular shape, and then, is formed into a square bundle shape (rectangular shape), as a whole. A plurality of protrusions 51 for engagement are provided on an inner side of the channel box 20. These protrusions 51 are provided so as to correspond to unevenness on the outer side of the fuel bundle 21 and attains a function as a guide. Further, the protrusions 51 extend along the axial direction of the channel box 20 and form water removal space. Moreover, the protrusions 38 shown in FIG. 4 may be provided on the outer sides of the channel box 20, and if the protrusions 38 are provided, the ratio of water to fuel can be made smaller.

The inner side of the channel box 20 is provided with the protrusions 51, each facing recess portion of the outer side of the fuel bundle 21. According to this arrangement, it is possible to make small a gap defined between the fuel bundle 21 and the channel box 20. Further, the protrusions 51 are provided so as to correspond to unevenness formed on the outer sides of the fuel bundle 21, and it is therefore possible to lower the ratio of water to nuclear fuel and to increase the breeding ratio of the nuclear fuel, while the void reactivity can be reduced.

Figure 14:
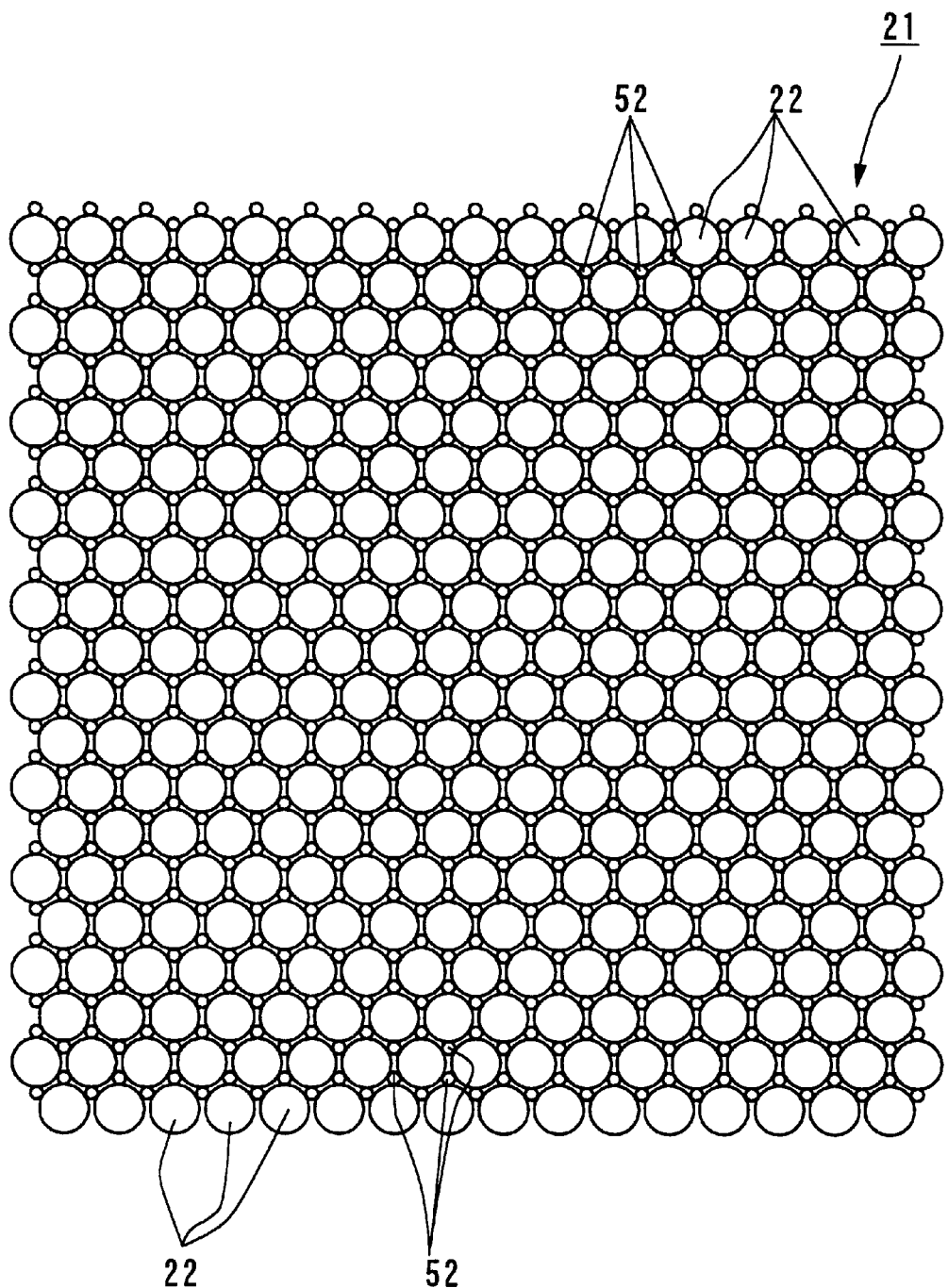
FIG. 14 is a top plan view showing an arrangement between each fuel assembly and a coolant removal rod which have a triangular arrangement of a fuel bundle housed in a fuel assembly channel box.

The fuel bundle 21 housed in the channel box 20 is constructed as shown in FIG. 14. More specifically, a coolant removal rod 52 is arranged on the center in each gap between three fuel rods 22 which have a triangular arrangement structure in its fuel rod arrangement. The coolant (water) removal rod 52 is made of zirconium, zircaloy or aluminum material having a small neutron absorption cross section. Preferably, the coolant removal rod 52 is formed into a shape of a hollow tube so as to restrict a neutron absorbing moderation by the structural material of the coolant removal rod 52.

The coolant removal rod 52, which does not contain a nuclear fuel, is provided in each gap between fuel rods 22 to reduce the amount of coolant, and a change in the coolant amount after and before the void becomes small. In a water cooling reactor of a fast spectral system, a positive void reactivity occurs.

The principal factor is as follows. More specifically, a moderation of neutron is reduced due to void effect of coolant, and the neutron spectrum is hardened, and thus, a neutron per absorption reaction of fissionable material (nuclear fuel material) is much generated and increase in its number.

In the cooling water reactor, a factor of the positive void reactivity is eliminated by decreasing an amount of the coolant existing in the reactor core 10A, and the neutron leakage effect which is a factor of negative void reactivity, is unchanged, so that the void reactivity can be reduced as a whole.

Next, the operation of the reactor core of the second embodiment will be described hereunder.

The reactor core 10A is applied to a water cooling reactor, and during normal operation, in the reactor core 10A, a nuclear fissionable material (a nuclear fuel) such as plutonium or the like is mainly subjected to the fission reaction by means of neutrons so that heat and neutrons (mainly, fast neutrons) are generated.

A part of generated neutrons leaks outside the reactor core 10A. However, most neutrons are moderated and scattered by water serving as a coolant flowing between the fuel rod 22 and the channel box 20 or between the channel boxes 20, and then, are again incident upon the fuel rod 22 so as to cause a fission reaction or neutron absorption reaction. If the ratio of water to fuel is small, the neutron moderation effect by water is small, and an average neutron energy is close to a sodium water cooling type fast breeder reactor.

In the reactor core 10A, the hermetic container 50, which is filled with a sealed gas, is provided on the upper portion of the partial fuel assembly 14. Thus, the hermetic container 50 serves to remove the water as the coolant, and the ratio of water to fuel is small, and further, the number of generated neutrons per neutron absorption is two or more. Therefore, the number of neutrons absorbed in the parent material such as U-238 is much, and as a result, the breeding ratio can be increased.

An empty space in the hermetic container 50 is filled with a gas, and for this reason, an atomic abundance density is lower than a state that water is boiled, and scattering reaction of neutrons is hard to occur. Therefore, the neutrons are easy to pass through the hermetic container 50, so that the neutrons can easily leak from the reactor core 10A in the core axial direction. For this reason, the coolant of the core fuel portion or the coolant of the streaming channel portion constituting the streaming path 16 can facilitate a leakage of voided neutron in the core axial direction, and it is possible to lower the void reactivity and to make it negative value.

In this case, aluminum, zirconium or zirconium alloy (zircaloy) is used as the material of the hermetic container 50 having an empty space, and it is therefore possible to make small neutron collision reaction of the neutron and the structural material of the hermetic container 50. On the other hand, if the hermetic container 50 is made of a high strength material such as stainless steel or the like, iron or nickel (Ni) is contained in the stainless steel. Thus, a neutron absorption cross section of iron or the like is relatively large, and an exothermic reaction will be caused by the neutron absorption. However, aluminum has a neutron absorption cross section smaller about one place in figure than that of iron. Further, zirconium or zircaloy has a neutron absorption cross section which is about a half of the neutron absorption cross section of nickel, and the exothermic reaction caused by neutron absorption is decreased.

If aluminum, zirconium or zirconium alloy (zircaloy) is used as the material of the hermetic container 50, neutron absorption by the hermetic container 50 is reduced. On the other hand, neutron absorption by the parent material (U-238) in nuclear fuel material is relatively increased. The U-238 is made into $^{239}$Pu (Pu-239) by neutron absorption, and is used as a nuclear fuel, thus increasing the breeding ratio.

Moreover, a scattering cross section of neutron is substantially the same as that of an element such as aluminum or zirconium. However, aluminum or zirconium has a metallic atomic density smaller than that of stainless steel, and therefore, a neutron scattering is hard to be caused. Thus, the neutron is easy to pass through the hermetic container 50 in the axial direction, that is, streaming is easy to be made, so that the void reactivity can be further lowered.

In the fuel assembly 11, the coolant removal rod 52 is provided between fuel rods 22 which form a triangular arrangement, and the protrusion 51 is provided in the channel box 22. According to this arrangement, an amount of water which is a coolant is reduced, so that the void reactivity can be further lowered. At this time, the protrusions 38 as shown in FIG. 4 are additionally provided on the central portions of the outer sides of the channel box 20, thus an amount of coolant being further reduced. Therefore, the protrusion 38 performs a function of lowering the void reactivity.

Figure 15:
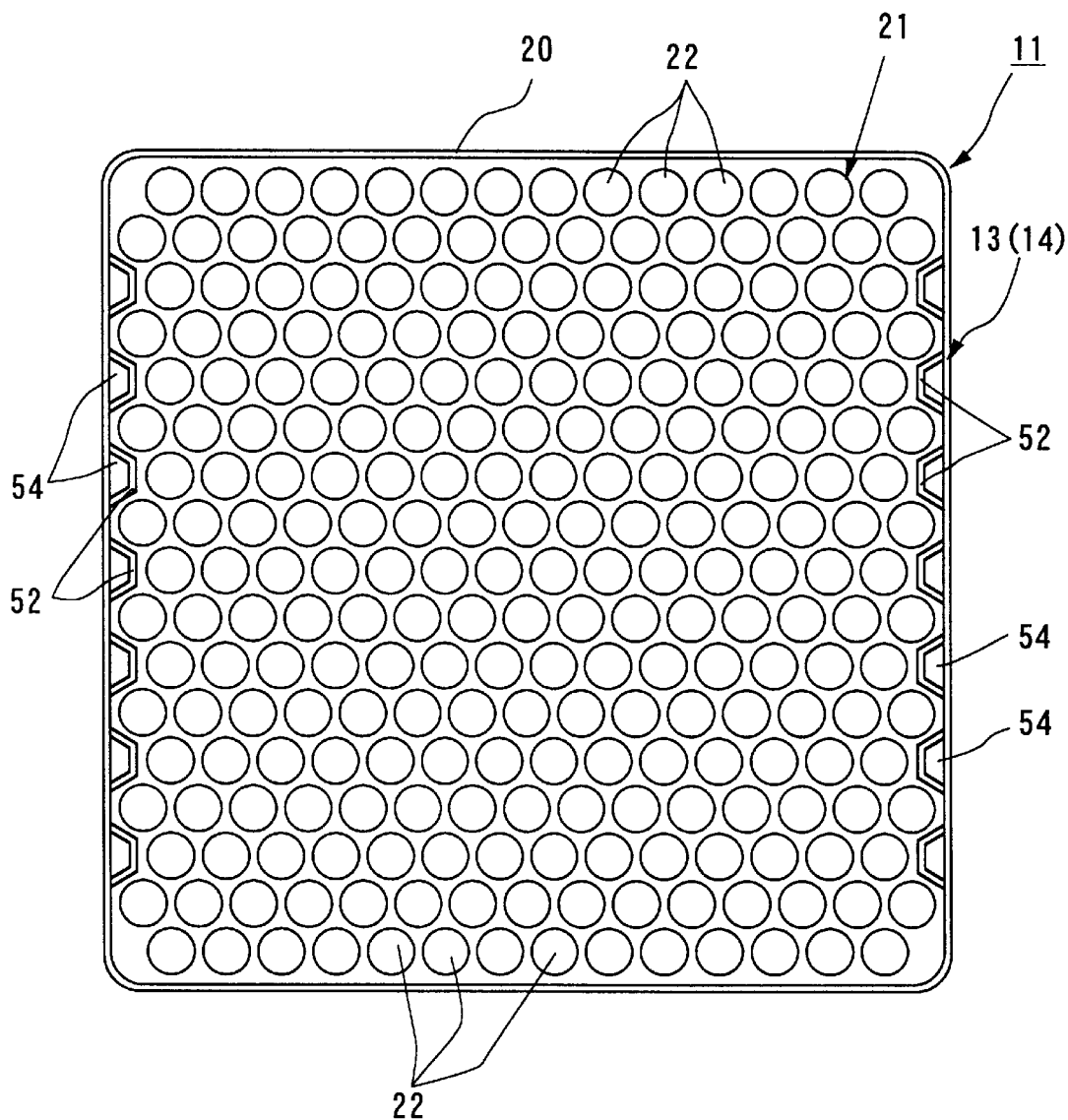
FIG. 15 is a view showing an engaging protrusion (projection) provided on an inner surface of the channel box in the fuel assembly charged in the reactor core according to the present invention.

In the fuel assembly 11 shown in FIG. 12 and FIG. 13, although there is shown an example in which the protrusion 51 has been provided in the channel box along the longitudinal direction of the channel box 20, the protrusion 51 may be constructed as shown in FIG. 15. The protrusion 51 shown in FIG. 15 is formed so as to have an inner hollow structure. Therefore, the structural material (protrusion itself) reacting with a neutron is reduced in its amount so as to further increase the breeding ratio. The neutron leakage to the core axial direction is easy to be caused, so that the void reactivity can be lowered.

Figure 16:
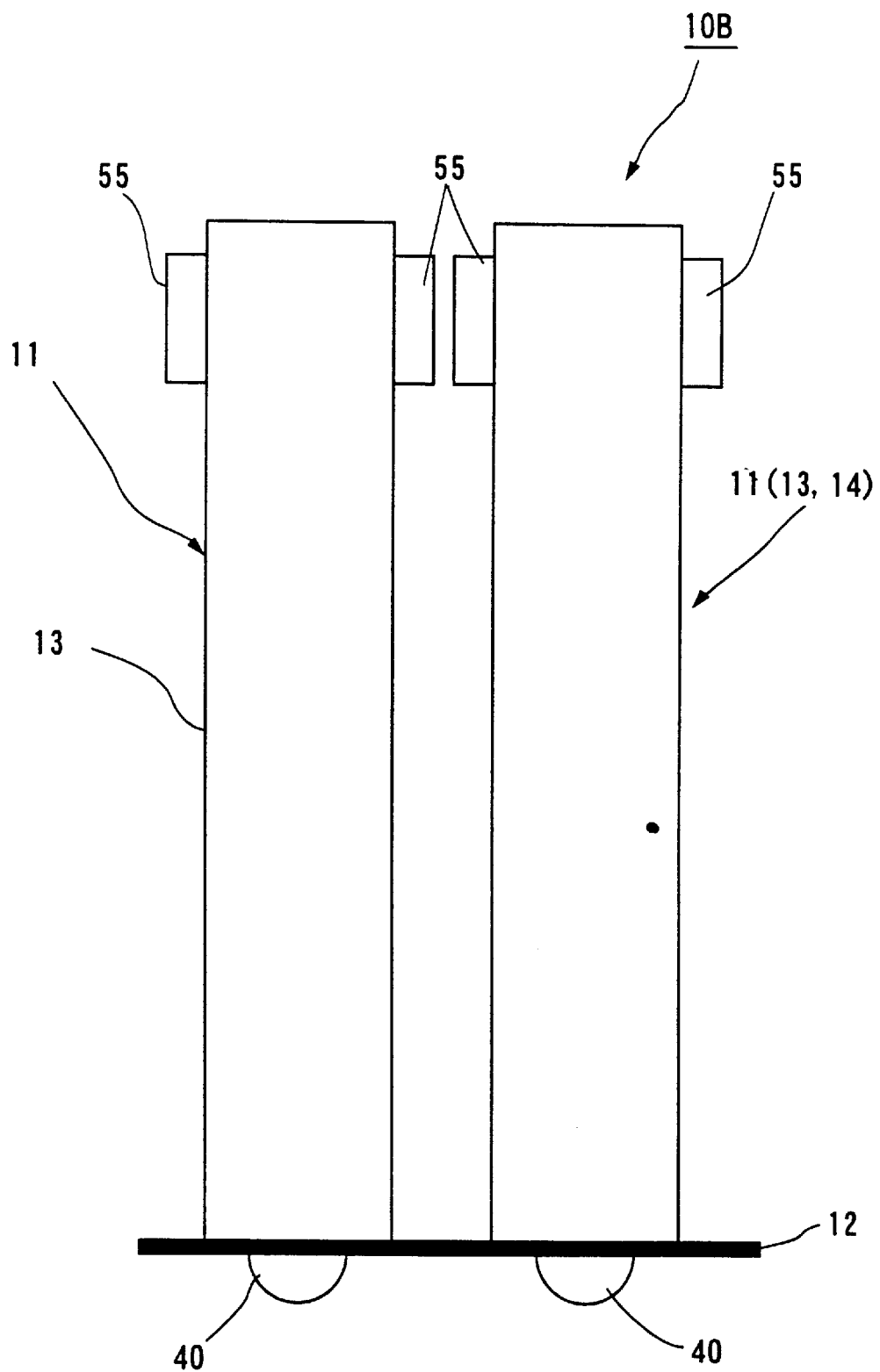
FIG. 16 shows a third embodiment of a reactor core according to the present invention and is a view schematically showing a reactor core arrangement of a fuel assembly.

Next, a third embodiment of a reactor core according to the present invention will be described hereunder with reference to FIG. 16 and FIG. 17.

In the reactor core of this third embodiment, the fuel assembly 11 charged in a reactor core 10B is improved. The entire construction of the reactor core of this embodiment substantially the same as that of FIG. 1 and FIG. 2, and therefore, the details are omitted.

In the reactor core 10B, the fuel assemblies 11 are provided with support pads 55 at upper portions on the outer peripheries thereof. The support pad 55 serves to dispense an upper plate lattice which functions as a fuel assembly fixing frame used in the existing light water reactor.

Figure 17:
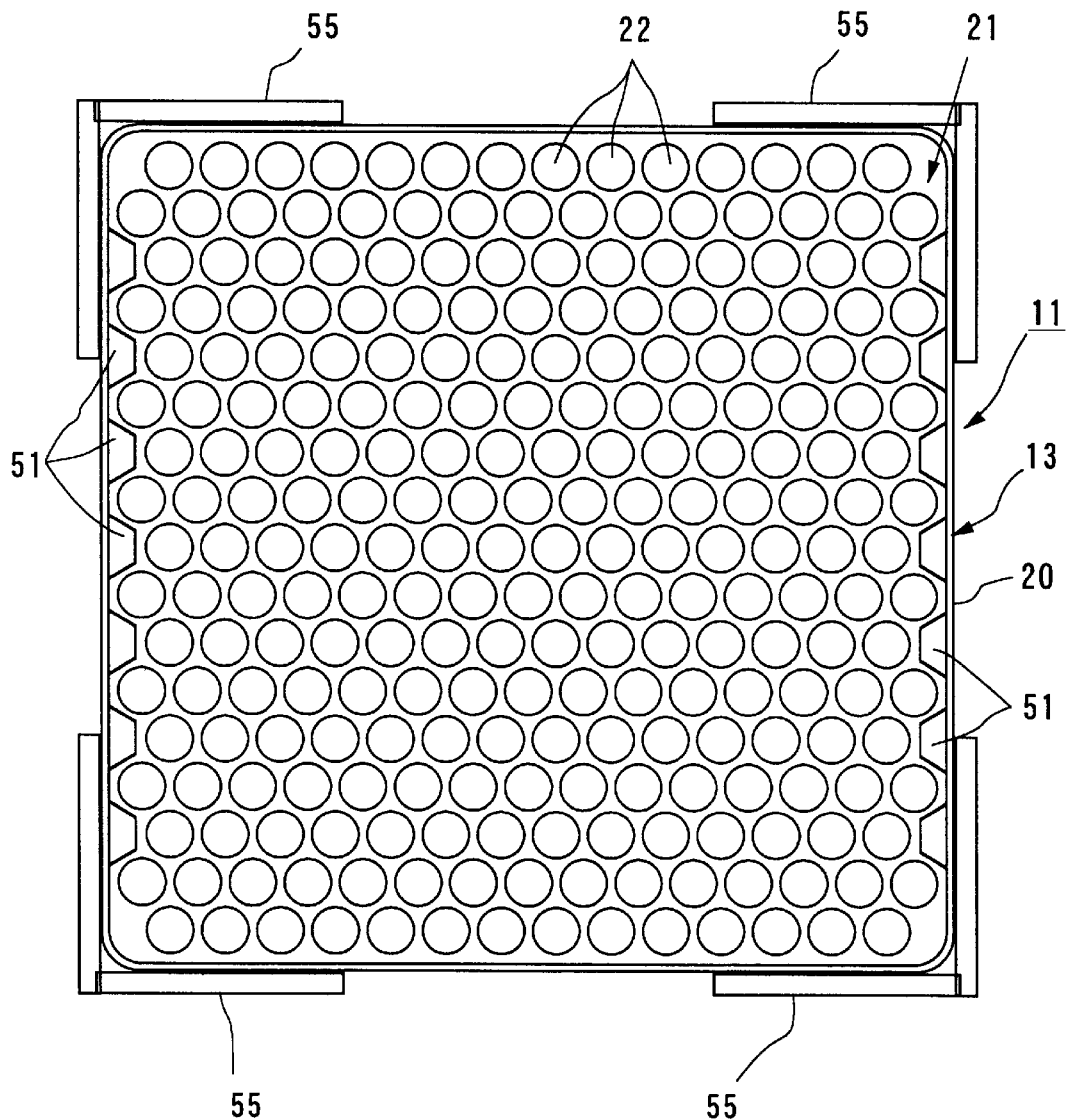
FIG. 17 is a top plan view of the fuel assembly shown in FIG. 16.

The support pad 55 has an L- or V-letter shape in plane as shown in FIG. 17 and is provided at each of four corners on the upper portion of the channel box 20 of the fuel assembly 11. The support pads 55 are provided at the corner portions of the upper side on the outer periphery of the fuel assembly 11 so as to make it possible to dispense or eliminate a fuel assembly fixing frame for supporting the top portion of the fuel assembly 11 in the horizontal direction. Thus, a gap between fuel assemblies 11 is made narrow, and the fuel assembly is much charged in the reactor core, so that the breeding ratio can be increased.

The L-shaped support pad 55 is attached so as to ride on each corner portion of the cylindrical channel box 20 of the fuel assembly 11 from the side portion. Thus, the fuel assemblies 11 adjacent to each other are stably supported by means of two support pads 55 which contact with each other at two places on both sides in the widthwise direction of the channel box 20. Therefore, it is possible to surely prevent the fuel assemblies 11 from directly contacting to each other and to ensure a gap for inserting the control rod 18 between adjacent fuel assemblies 11 so that the control rod 18 can be stably withdrawal.

Figure 18:
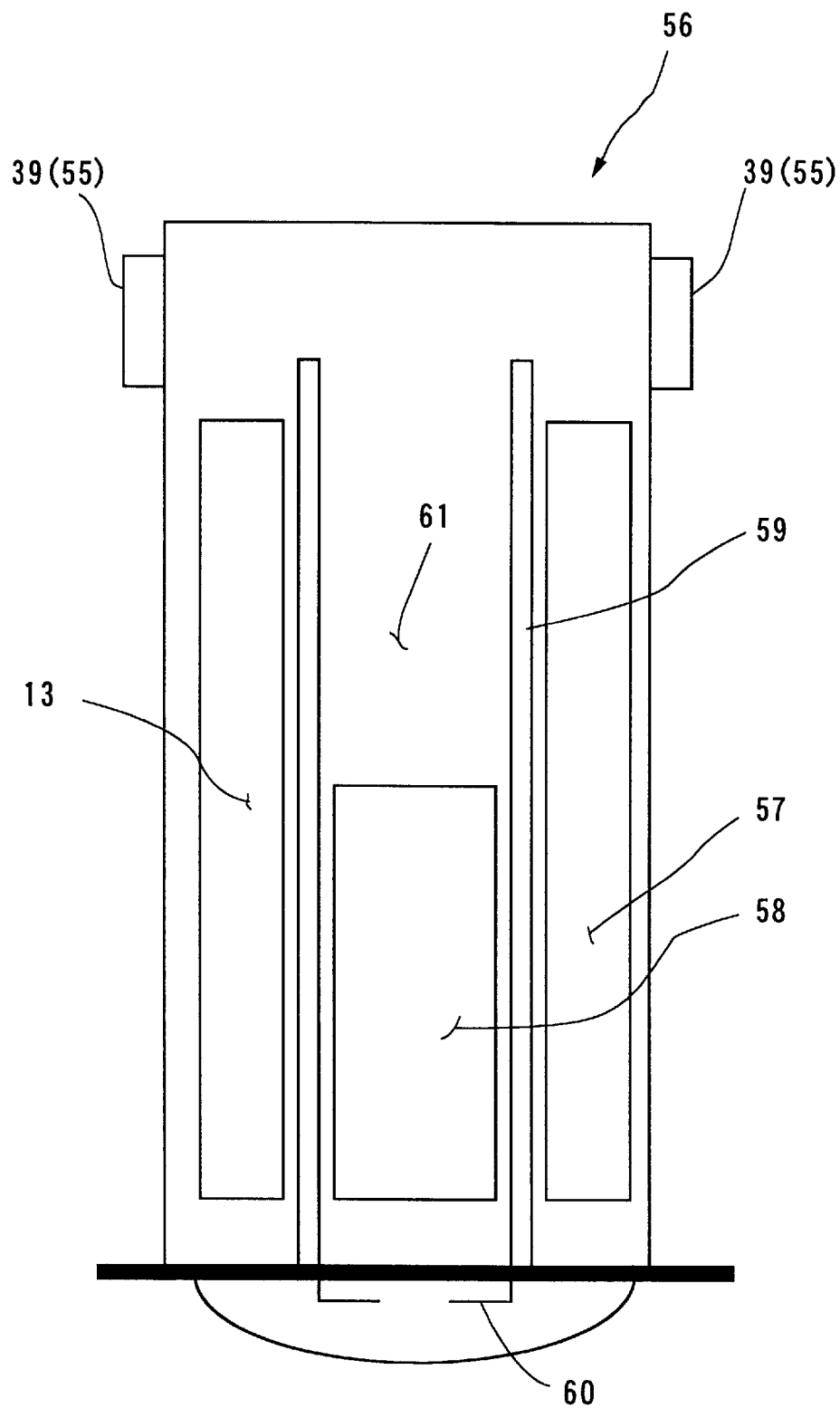
FIG. 18 shows a fourth embodiment of a reactor core according to the present invention and is a sectional side view showing a fuel assembly including a normal fuel element region and a partial fuel element region.

FIG. 18 shows a fourth embodiment of a reactor core according to the present invention.

In the reactor core of in this fourth embodiment, a fuel assembly 56 charged in the reactor core has an improved structure. The fuel assembly 56 of this embodiment is not constructed in a manner that the normal fuel assembly 13 and the partial fuel assembly 14 are combined. The fuel assembly 56 of this embodiment includes a normal fuel element region 57 and a partial fuel element region 58. The normal fuel element region 57 and the partial fuel element region 58 are formed through a coolant channel partition wall 59 and are housed in the rectangular cylindrical channel box 20. In FIG. 18, there is shown an arrangement example such that the partial fuel element region 58 is formed on the central portion of the fuel assembly 56, and the normal fuel element region 57 is formed at the peripheral portion of the partial fuel element region 58.

The normal fuel element region 57 is formed in a manner that a normal fuel element having an ordinary fuel effective (exothermic portion) length LM is arranged, and on the other hand, the partial fuel element region 58 is formed in a manner that a short-dimension fuel element having a short fuel effective length LP is arranged. Both the normal and short-dimension fuel elements comprises a fuel rod, for example.

Flow rates of the coolant guided into the normal fuel element region 57 of the fuel assembly 56 and the partial fuel element region 58 thereof are suitably distributed by means of an orifice 60, which is provided on the upper portion of the fuel assembly 56. According to this structure, the upper portion of the partial fuel element region 58 is voided and a neutron streaming path 61 is formed on the voided portion. At this time, the partial fuel element region 58 facilitates the leakage of neutron in the core direction, so that the void reactivity can be lowered. An empty can-like hermetic container as shown in FIG. 11 and FIG. 13 may be provided on the upper portion of the partial fuel element region 58.

In the above fourth embodiment of the arrangement mentioned above, the partial fuel element region 58 is formed on the central portion of the fuel assembly 56, and the normal fuel element region is formed at the periphery of the partial fuel element region 58. In this fourth embodiment, the normal fuel element region 58 and the partial fuel element region 57 may be arranged in the manner reverse to the above arrangement, or various modifications may be made. Further, it may be possible to divide the region into three or more regions other than two regions, and each region may be properly selected as a normal fuel element region or as a partial fuel element region.

Each of the above embodiments shows the example of the reactor core in which fuel rods as fuel elements are arranged in the fuel assembly 11 so as to form a triangular structure. These fuel rods 22 may be arranged so as to form a square, like the existing fuel assembly as shown in FIG. 19.

In this case, in order to decrease the volume ratio of water to nuclear fuel of the fuel assembly charged in the reactor core, the coolant removal rod 52 is provided at the central portion between four adjacent fuel rods 22 which are mutually arranged so as to provide a square shape. Preferably, the coolant removal rod 52 is formed with an inner hollow structure so as to restrict moderation of neutrons. The coolant removal rod 52 is provided at the central portion between fuel rods 22 which are arranged so as to form a square, and the coolant having a large neutron moderation is removed. The coolant removal rod 52 is formed with the inner hollow structure, and the moderation of neutrons by the structural material (coolant removal rod) is restricted. Therefore, the breeding ratio can be increased. In this case, it is possible to facilitate a leakage of neutron in the axial direction of the coolant removal rod 52, and neutron leakage effect is enhanced. Therefore, the void reactivity lowering effect is slightly caused, thus contributing to lowering of the void reactivity.

Figure 19:
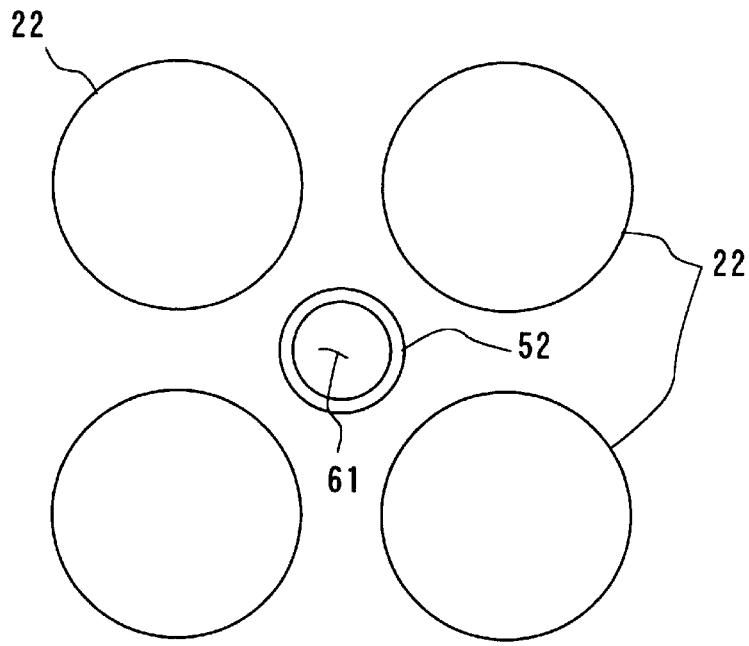
FIG. 19 is a top plan view showing a arrangement relationship between each fuel rod and a coolant removal rod having a square arrangement structure in the fuel assembly charged in a reactor core.
Figure 20:
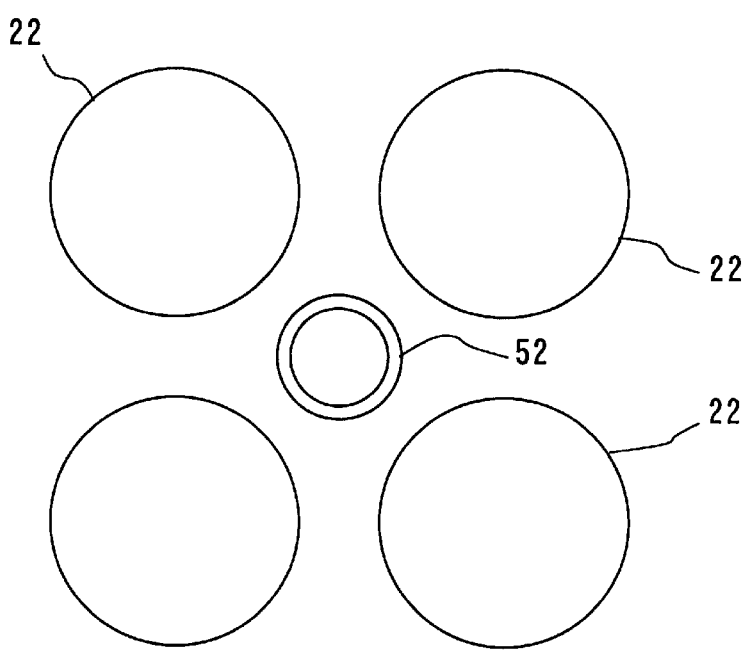
FIG. 20 is a top plan view showing a modified example of the arrangement between each fuel rod and the coolant removal rod shown in FIG. 19.

FIG. 20 shows a modified example of FIG. 19, in which the coolant removal rod 52, which is provided at the central portion between fuel rods 22 arranged so as to provide a square shape, is made of aluminum, zirconium or zircaloy having a low neutron absorption cross section. As described above, since the coolant removal rod 52 is made of a material having a low neutron absorption, the neutron absorption is restricted and the breeding ratio can be increased.

In the embodiments of the present invention described above, although the reactor core is applied to the boiling water reactor, the arrangements or structures of the normal fuel assembly and the partial fuel assembly are applicable to a reactor core of a pressurized water reactor. In the case of being applied to the pressurized water reactor, a position where the fuel effective portion of the partial fuel assembly is formed is not specially limited, and the fuel effective portion may be in line with the upper side of the fuel effective portion of the normal fuel assembly. Further, a cluster type control rod is used as the control rod. According to the cluster type control rod, the control rod is taken in and out of the fuel assembly from the upper portion thereof. For this reason, in the cluster type control rod, a follower forming a water removal space is provided on the lower portion of the control rod absorber. In this manner, the present invention is applicable to a water cooling reactor which uses water as a coolant.

As is evident from the above explanation, in the reactor core according to the present invention, the fuel volume ratio is increased so as to lower the ratio of water to fuel, and it is therefore possible to increase a breeding ratio and to improve the utilization factor of uranium resource. Thus, the uranium resource can be effectively utilized, and environmental protective, stability and economy can be greatly improved.

It is to be noted that the present invention is not limited to the described embodiments and many other changes and modifications may be made without departing from the scopes of the appended claims.

What is claimed is:

1. A reactor core comprising:

a plurality of fuel assemblies; and a plurality of control elements disposed between said fuel assemblies and having blades defining gaps between said fuel assemblies, wherein:

the reactor core has a ratio of a coolant channel cross section to a fuel cross section of 1 or less, and each of said fuel assemblies comprises:

a channel box having at least one outer protrusion located in one of said gaps between blades of adjacent control elements; wherein the at least one outer protrusion interior is formed as a hollow structure, and a fuel bundle of fuel rods, said fuel bundle having a substantially rectangular cross section.

2. A reactor core according to claim 1, wherein said fuel assemblies have an arrangement pitch of about 300 mm or more.

3. A reactor core according to claim 1, wherein each of said fuel assemblies further comprises:

a support pad at an upper portion of said channel box arranged to mutually support fuel assemblies adjacent to each other in a transverse direction.

4. A reactor core according to claim 1, wherein each of said fuel assemblies further comprises:

a grid-shaped spacer arranged to hold said fuel rods in said bundle in a triangular shape.

5. A reactor core according to claim 4, wherein said grid-shaped spacer comprises:

a grid; and a spring mechanism attached to the grid and arranged to prevent vibration of the fuel rods.

6. A reactor core according to claim 5, wherein said spring mechanism and said grid are integral with each other.

7. A reactor core according to claim 4, wherein said grid-shaped spacer comprises a stainless steel or inconell.

8. A reactor core according to claim 1, wherein:

each of said fuel assemblies comprises a fuel spacer in said channel box arranged to hold said fuel rods, said fuel rods have a fuel cladding tube filled with a fuel material, and at least one of said channel box and said fuel cladding tube comprises a stainless steel.

9. A reactor core according to claim 8, wherein said fuel material comprises plutonium and recovery uranium.

10. A reactor core according to claim 1, wherein said fuel assemblies comprise at least a first fuel assembly with a first exothermic portion length and a second fuel assembly with a second exothermic portion length, wherein said second exothermic portion length is shorter than said first exothermic portion length.

11. A reactor core according to claim 10, wherein said first exothermic portion length is 2 m or less and said second exothermic portion length is 1 m or less.

12. A reactor core according to claim 1, wherein said fuel rods form a triangular shape.

13. A reactor core according to claim 1, wherein said channel box has a rectangular cross-section with four sides and an outer protrusion on each of said four sides.

14. A reactor core according to claim 1, wherein said channel box has a rectangular cross-section with four sides and an outer protrusion at the center of each of said four sides.

* * * * *